US011493937B2

United States Patent
Zhang et al.

(10) Patent No.: US 11,493,937 B2
(45) Date of Patent: Nov. 8, 2022

(54) TAKEOFF AND LANDING CONTROL METHOD AND CONTROL APPARATUS OF MULTIMODAL AIR-GROUND AMPHIBIOUS VEHICLE, AND COMPUTER STORAGE MEDIUM

(71) Applicant: Tsinghua University, Beijing (CN)

(72) Inventors: Xinyu Zhang, Beijing (CN); Jun Li, Beijing (CN); Qifan Tan, Beijing (CN); Jianxi Luo, Beijing (CN); Huaping Liu, Beijing (CN); Kangyao Huang, Beijing (CN); Xingang Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/577,044

(22) Filed: Jan. 17, 2022

(65) Prior Publication Data
US 2022/0229448 A1  Jul. 21, 2022

(30) Foreign Application Priority Data
Jan. 21, 2021  (CN) .......................... 202110083068.0

(51) Int. Cl.
G05D 1/10 (2006.01)
B60F 5/00 (2006.01)
B64C 37/00 (2006.01)

(52) U.S. Cl.
CPC ............. *G05D 1/101* (2013.01); *B60F 5/003* (2013.01); *B64C 37/00* (2013.01)

(58) Field of Classification Search
CPC ..................................................... G05D 1/101
See application file for complete search history.

(56) References Cited

U.S. PATENT DOCUMENTS

| 5,437,230 A | * | 8/1995 | Harris | ....................... | B63G 7/00 102/302 |
| 6,202,960 B1 | * | 3/2001 | Travis | ..................... | F16F 7/104 188/380 |

(Continued)

FOREIGN PATENT DOCUMENTS

| CN | 1241499 A | 1/2000 |
| CN | 206242832 U | 6/2017 |

(Continued)

OTHER PUBLICATIONS

Xinyuan Luo, Design and Optimization of Light Amphibious vehicle suspension system, 2013, pp. 17, China excellent Master's degree thesis full-text Database Engineering Science and Technology part II.

(Continued)

*Primary Examiner* — Jean Paul Cass
(74) *Attorney, Agent, or Firm* — Bayramoglu Law Offices LLC

(57) ABSTRACT

A takeoff and landing control method of a multimodal air-ground amphibious vehicle includes: receiving dynamic parameters of the multimodal air-ground amphibious vehicle; processing the dynamic parameters by a coupled dynamic model of the multimodal air-ground amphibious vehicle to obtain dynamic control parameters of the multimodal air-ground amphibious vehicle, wherein the coupled dynamic model of the multimodal air-ground amphibious vehicle comprises a motion equation of the multimodal air-ground amphibious vehicle in a touchdown state; and the motion equation of the multimodal air-ground amphibious vehicle in a touchdown state is determined by a two-degree-of-freedom suspension dynamic equation and a six-degree-of-freedom motion equation of the multimodal air-ground amphibious vehicle in the touchdown state; and controlling takeoff and landing of the multimodal air-ground amphibi- (Continued)

ous vehicle according to the dynamic control parameters of the multimodal air-ground amphibious vehicle. The method is used for takeoff and landing control of a multimodal air-ground amphibious vehicle.

7 Claims, 35 Drawing Sheets

(56) References Cited

U.S. PATENT DOCUMENTS

| | | | |
|---|---|---|---|
| 11,036,230 B1* | 6/2021 | Ebrahimi Afrouzi | ........................ G05D 1/0016 |
| 2018/0304710 A1 | 10/2018 | Hamel | |
| 2020/0307790 A1* | 10/2020 | Babin | ........................ B64C 5/02 |
| 2022/0032925 A1* | 2/2022 | Liu | .................... B60W 50/0098 |
| 2022/0066456 A1* | 3/2022 | Ebrahimi Afrouzi | ........................ A47L 11/4013 |

FOREIGN PATENT DOCUMENTS

| | | | | |
|---|---|---|---|---|
| CN | 108839822 A | | 11/2018 | |
| CN | 110654195 A | | 1/2020 | |
| CN | 111452800 B | * | 5/2021 | ................ B60F 3/00 |
| CN | 112744227 A | * | 5/2021 | ................ B60F 5/02 |
| EP | 3392068 A1 | | 10/2018 | |

OTHER PUBLICATIONS

Peng Zhang, Performance Simulation of self-rotating rotor Land and Air vehicles, 2016, pp. 41, China excellent Master's degree thesis full-text Database Engineering Science and Technology part II.

\* cited by examiner ated by a two-degree-of-freedom suspension dynamic equation and a six-degree-of-freedom motion equation of the multimodal air-ground amphibious vehicle in the touchdown state, not only can accurately describe the motion state on six degrees of freedom during takeoff and landing of the multimodal air-ground amphibious vehicle, but also can accurately describe the motion state on two degrees of freedom (vertical direction) of the suspension during takeoff and landing of the multimodal air-ground amphibious vehicle. In this case, the motion states in the vertical direction of the tires and vehicle body connected to the suspension can be determined from the motion state in the vertical direction of the suspension, so that the motion state on the six degrees of freedom of the multimodal air-ground amphibious vehicle and the motion states in the vertical direction of the tires, the suspension and the vehicle body can be controlled during takeoff and landing by using the coupled dynamic model of the multimodal air-ground amphibious vehicle containing the motion equation of the multimodal air-ground amphibious vehicle in the touchdown state, to achieve the purpose of precisely controlling the motion state of the multimodal air-ground amphibious vehicle during takeoff and landing to avoid accidents.
TAKEOFF AND LANDING CONTROL METHOD AND CONTROL APPARATUS OF MULTIMODAL AIR-GROUND AMPHIBIOUS VEHICLE, AND COMPUTER STORAGE MEDIUM

CROSS REFERENCE TO THE RELATED APPLICATIONS

This application is based upon and claims priority to Chinese Patent Application No. 202110083068.0, filed on Jan. 21, 2021, the entire contents of which are incorporated herein by reference.

TECHNICAL FIELD

The present invention relates to the field of vehicle technology, and in particular, to a takeoff and landing control method and control apparatus of a multimodal air-ground amphibious vehicle, and a computer storage medium.

BACKGROUND

A multimodal air-ground amphibious vehicle (flying automobile) is transport means that combines advantages of an aircraft and an automobile. Nowadays, with an increasingly serious traffic congestion problem, a multimodal air-ground amphibious vehicle that can both fly in the air and travel on the ground brings a new travel mode for human beings while solving the traffic congestion problem.

However, it is difficult to precisely control the motion state of the multimodal air-ground amphibious vehicle due to complex forces during takeoff and landing of the multimodal air-ground amphibious vehicle.

SUMMARY

An object of the present invention is providing a takeoff and landing control method and control apparatus of a multimodal air-ground amphibious vehicle, and a computer storage medium, to precisely control the motion state of the multimodal air-ground amphibious vehicle during takeoff and landing.

To achieve the above object, the present invention provides a takeoff and landing control method of a multimodal air-ground amphibious vehicle. The multimodal air-ground amphibious vehicle includes an aircraft and a vehicle that are rigidly connected, the takeoff and landing control method of the multimodal air-ground amphibious vehicle including:

receiving dynamic parameters of the multimodal air-ground amphibious vehicle;

processing the dynamic parameters by a coupled dynamic model of the multimodal air-ground amphibious vehicle to obtain dynamic control parameters of the multimodal air-ground amphibious vehicle, wherein the coupled dynamic model of the multimodal air-ground amphibious vehicle includes a motion equation of the multimodal air-ground amphibious vehicle in a touchdown state; and the motion equation of the multimodal air-ground amphibious vehicle in a touchdown state is determined by a two-degree-of-freedom suspension dynamic equation and a six-degree-of-freedom motion equation of the multimodal air-ground amphibious vehicle in the touchdown state; and controlling takeoff and landing of the multimodal air-ground amphibious vehicle according to the dynamic control parameters of the multimodal air-ground amphibious vehicle.

Compared with the prior art, the takeoff and landing control method of a multimodal air-ground amphibious vehicle provided in the present invention, by using the motion equation of the multimodal air-ground amphibious vehicle in the touchdown state determined by the two-degree-of-freedom suspension dynamic equation and the six-degree-of-freedom motion equation of the multimodal air-ground amphibious vehicle in the touchdown state, not only can accurately describe the motion state on six degrees of freedom during takeoff and landing of the multimodal air-ground amphibious vehicle, but also can accurately describe the motion state on two degrees of freedom (vertical direction) of the suspension during takeoff and landing of the multimodal air-ground amphibious vehicle. In this case, the motion states in the vertical direction of the tires and vehicle body connected to the suspension can be determined from the motion state in the vertical direction of the suspension, so that the motion state on the six degrees of freedom of the multimodal air-ground amphibious vehicle and the motion states in the vertical direction of the tires, the suspension and the vehicle body can be controlled during takeoff and landing by using the coupled dynamic model of the multimodal air-ground amphibious vehicle containing the motion equation of the multimodal air-ground amphibious vehicle in the touchdown state, to achieve the purpose of precisely controlling the motion state of the multimodal air-ground amphibious vehicle during takeoff and landing to avoid accidents.

The present invention also provides a takeoff and landing control apparatus of a multimodal air-ground amphibious vehicle. The takeoff and landing control apparatus of a multimodal air-ground amphibious vehicle includes a processor and a communication interface coupled to the processor, wherein processor is configured to run a computer program or instructions to execute the above-mentioned takeoff and landing control method of a multimodal air-ground amphibious vehicle.

Compared with the prior art, the takeoff and landing control apparatus of a multimodal air-ground amphibious vehicle provided in the present invention has the same beneficial effects as the takeoff and landing control method of a multimodal air-ground amphibious vehicle described in the above technical solution, which will not be repeated here.

The present invention also provides a computer storage medium. The computer storage medium stores instructions which, when being run, implement the above-mentioned takeoff and landing control method of a multimodal air-ground amphibious vehicle.

Compared with the prior art, the computer storage medium provided in the present invention has the same beneficial effects as the takeoff and landing control method of a multimodal air-ground amphibious vehicle described in the above technical solution, which will not be repeated here.

BRIEF DESCRIPTION OF THE DRAWINGS

The drawings described here are used to provide further understanding of the present invention and form a part of the present invention. The illustrative embodiments of the present invention and description thereof are used for explaining rather than unduly limiting the present invention. In the drawings:

In FIGS. 1 to 43, Time (s) in an abscissa represents to time (s); m/s in an ordinate represents to a velocity (m/s), ° represents to an angle (°), m represents to a distance (m), N represents to an acting force (N), r/s represents a rotational speed (r/s), and rad/s represents to an angular velocity (rad/s).

DETAILED DESCRIPTION OF THE EMBODIMENTS

Figure 1:
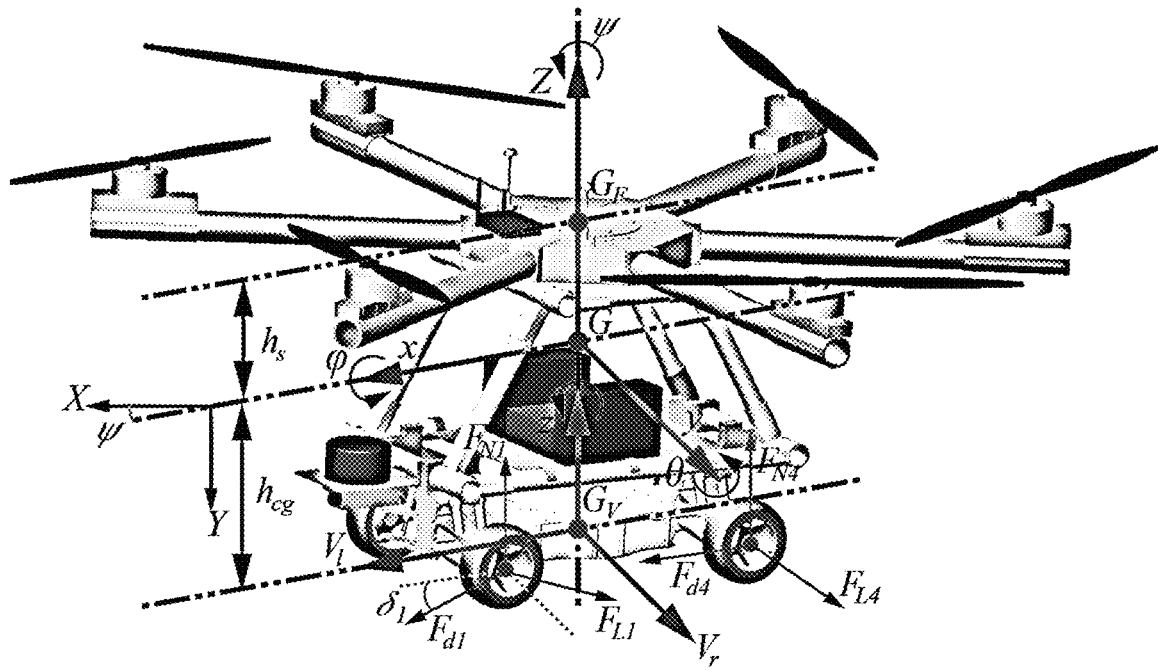
FIG. 1 is a schematic diagram of a flying automobile in a geodetic coordinate system in an embodiment of the present invention.

To make the technical problems to be solved, technical solutions, and beneficial effects of the present invention clearer and more apparent, the present invention will be further described in detail below in conjunction with the accompanying drawings and embodiments. It should be understood that the specific embodiments described herein are only used for explaining the present invention, rather than limiting the present invention.

It is to be noted that when an element is described as being "fixed to" or "arranged on" another element, it may be directly on another element or indirectly on another element. When an element is described as being "connected" to another element, it may be directly connected to another element or indirectly connected to another element.

In addition, the terms "first", "second" and the like are used only for descriptive purposes and cannot be construed as indicating or implying relative importance or implicitly indicating the numbers of indicated technical features. Thus, a feature qualified by the term "first", "second" or the like may explicitly or implicitly include one or more such features. In description of the present invention, the term "plurality" means two or more, unless otherwise expressly and specifically defined. The term "a number of" means one or more, unless otherwise expressly and specifically defined.

In description of the present invention, it needs to be understood that orientation or location relations denoted by the terms "upper", "lower", "front", "back", "left", "right", etc. are orientation or location relations based on illustration in the drawings, are only intended to facilitate describing the present invention and simplify description, instead of indicating or implying the denoted devices or elements necessarily have specific orientations and are constructed and operated in specific orientations, and thus they cannot be construed as limiting the present invention.

In description of the present invention, it is to be noted that, unless otherwise clearly specified and defined, the terms "install", "be connected with", "be connected", etc., should be understood in a broad sense. For example, the term "be connected" may indicate "be fixedly connected", "be detachably connected", "be integratedly connected", "be mechanically connected", "be electrically connected", "be directly connected", "be indirectly connected through an intermediate medium", or "internal communication between two elements or interactive relationship between two elements". For those of ordinary skill in the art, the specific meanings of the above terms in the present invention may be understood according to specific circumstances.

An embodiment of the present invention provides a takeoff and landing control method of a multimodal airground amphibious vehicle. The multimodal air-ground amphibious vehicle may also be referred to as a flying automobile. For the sake of brevity, the following description will be made with a flying automobile. The flying automobile includes an aircraft and a vehicle that are rigidly connected. For example, the aircraft is arranged on the top of the vehicle by means of a connecting rod.

The above-mentioned aircraft mainly provides a flight driving force for the flying automobile, so that the flying automobile can fly in the air. It should be understood that the aircraft may be a rotorcraft with six rotors, four rotors or other number of rotors, and may also be any other aircraft with a flight function.

The above-mentioned vehicle mainly provides a driving force for the flying automobile to travel on the ground, so that the flying automobile can travel on the ground. It should be understood that the vehicle may be a four-wheeled automobile, a six-wheeled automobile, a two-wheeled motorcycle, or the like, as long as it has the ability to travel on the ground, and the specific structure of the vehicle is not specifically limited in embodiments of the present invention. The above-mentioned vehicle may be unmanned transport means, or manned transport means. The transport means may be an automobile, or any other vehicle, or a device in any other vehicle form, such as a car, a truck, a motorcycle or a bus.

The above-mentioned takeoff and landing control method of a flying automobile may be used for motion state control of the flying automobile in a takeoff/landing state, or for motion state control of the flying automobile in a flying state, or for motion state control of the flying automobile in a touchdown state.

When the flying automobile is in the flying state or touchdown state, the flying automobile is in a typical single traveling mode, and the motion state of the flying automobile is determined by the aircraft or the vehicle. When the flying automobile is in the flying state, the aircraft provides a driving force for the flying automobile, and the motion state of the flying automobile is determined by dynamic parameters of the aircraft. In this case, adjusting the dynamic parameters of the aircraft can achieve motion state control of the entire flying automobile. When the flying automobile is in the touchdown state, the vehicle provides a driving force for the flying automobile, and the motion state of the flying automobile is determined by dynamic parameters of the vehicle. In this case, adjusting the dynamic parameters of the vehicle can achieve motion state control of the entire flying automobile.

When the flying automobile takes off or lands, the aircraft and the vehicle of the flying automobile work simultaneously to jointly provide a driving force for the flying automobile, and the aircraft and the vehicle interact with each other to produce a complex coupling effect in the flying automobile. In this case, it is difficult to precisely control the motion state of the flying automobile by the aircraft or the vehicle alone.

Figure 2:
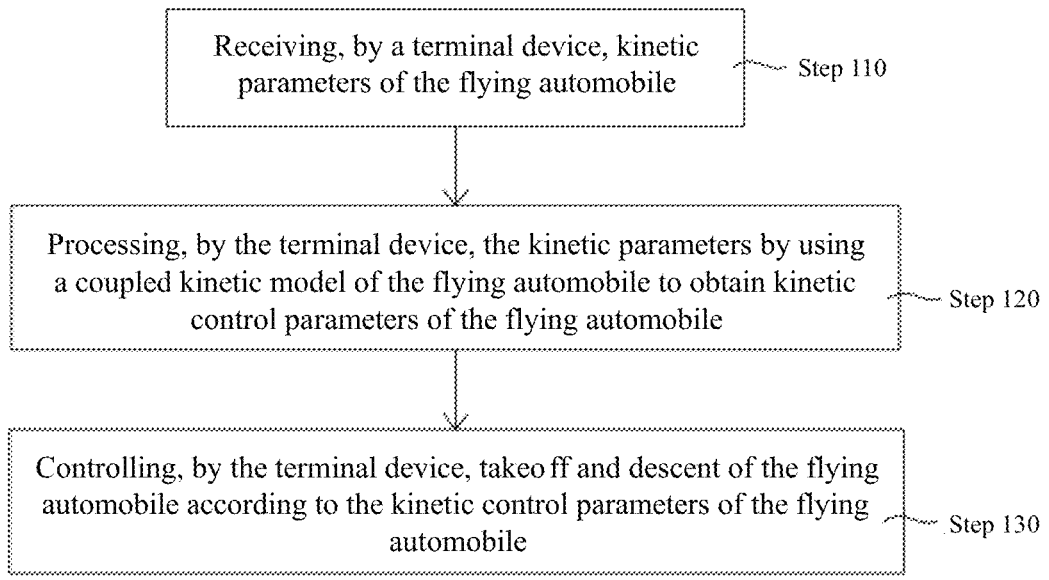
FIG. 2 is a flow diagram of a takeoff and landing control method of a flying automobile in an embodiment of the present invention.

To solve the above problem, the takeoff and landing control method of a flying automobile provided in the embodiment of the present invention may be executed by a terminal device or by a chip applied to a terminal device. As shown in FIG. 1, the following embodiment is described using a four-wheeled vehicle as an example with a terminal device as an executing device in a geodetic coordinate system. As shown in FIG. 2, a takeoff and landing control method of a flying automobile provided in an embodiment of the present invention includes:

Step 110: receiving, by a terminal device, dynamic parameters of the flying automobile. The above-mentioned dynamic parameters include attitude parameters of tires of the flying automobile and flight dynamic parameters.

The attitude parameters of each tire include an angular velocity and a steering angle. The steering angle of each tire is an angle of rotation of each tire around a z-axis. The angular velocity of each tire is an angular velocity of rotation of each tire around the center of the tire. The flight dynamic parameters include dynamic parameters of vertical motion, dynamic parameters of roll motion, dynamic parameters of pitch motion, and dynamic parameters of yaw motion of the aircraft.

Step 120: processing, by the terminal device, the dynamic parameters by using a coupled dynamic model of the flying automobile to obtain dynamic control parameters of the flying automobile.

The coupled dynamic model of the flying automobile includes a motion equation of the flying automobile in the touchdown state and a motion equation of the flying automobile in the flying state. The motion equation of the flying automobile in the touchdown state is determined by a two-degree-of-freedom suspension dynamic equation and a six-degree-of-freedom motion equation of the flying automobile in the touchdown state.

The above-mentioned dynamic control parameters include motion parameters of six degrees of freedom of the flying automobile, a vertical displacement of each tire of the flying automobile, and a vertical displacement of a vehicle body corresponding to each tire of the flying automobile.

The above-mentioned six degrees of freedom are motion along an x-axis direction, along a y-axis direction, and along a z-axis direction, roll motion around the x-axis, pitch motion around the y-axis, and vertical motion around the z-axis.

The motion parameters of the six degrees of freedom of the flying automobile include a velocity of the flying automobile in the x-axis direction, a velocity of the flying automobile in the y-axis direction, a velocity of the flying automobile in the z-axis direction, a roll angle of the flying automobile around the x-axis, a pitch angle of the flying automobile around the y-axis, and a yaw angle of the flying automobile around the z-axis.

Figure 3:
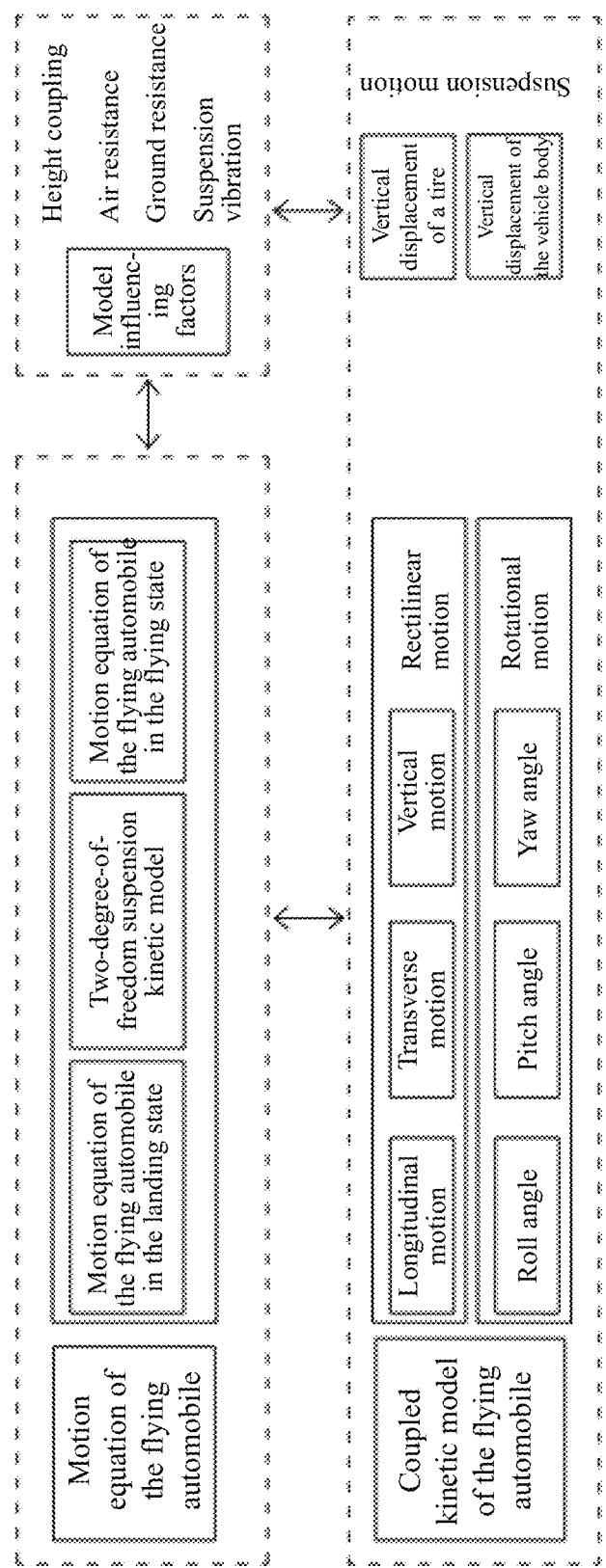
FIG. 3 is a flow diagram of establishing a coupled dynamic model of the flying automobile in an embodiment of the present invention.

As shown in FIG. 3, by studying the six-degree-of-freedom motion equation of the flying automobile in the touchdown state, the two-degree-of-freedom suspension dynamic equation, and the motion equation of the flying automobile in the flying state, while considering factors such as height coupling, air resistance, ground resistance, and suspension vibration, the coupled dynamic model of the flying automobile is established to obtain the dynamic control parameters of the flying automobile.

Figure 4:
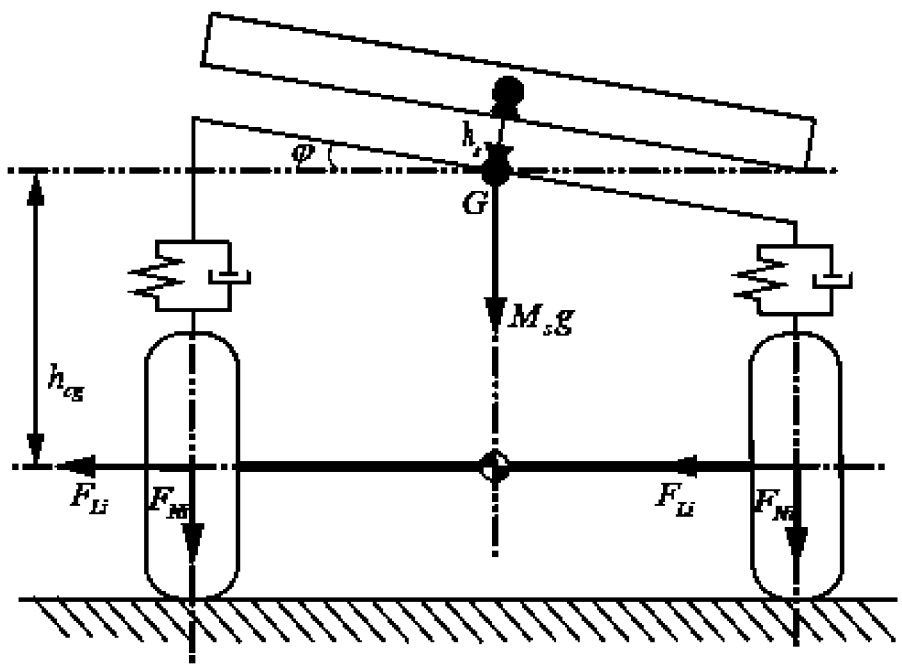
FIG. 4 is a front view of a vehicle mechanical model of the flying automobile in a touchdown state in an embodiment of the present invention.
Figure 5:
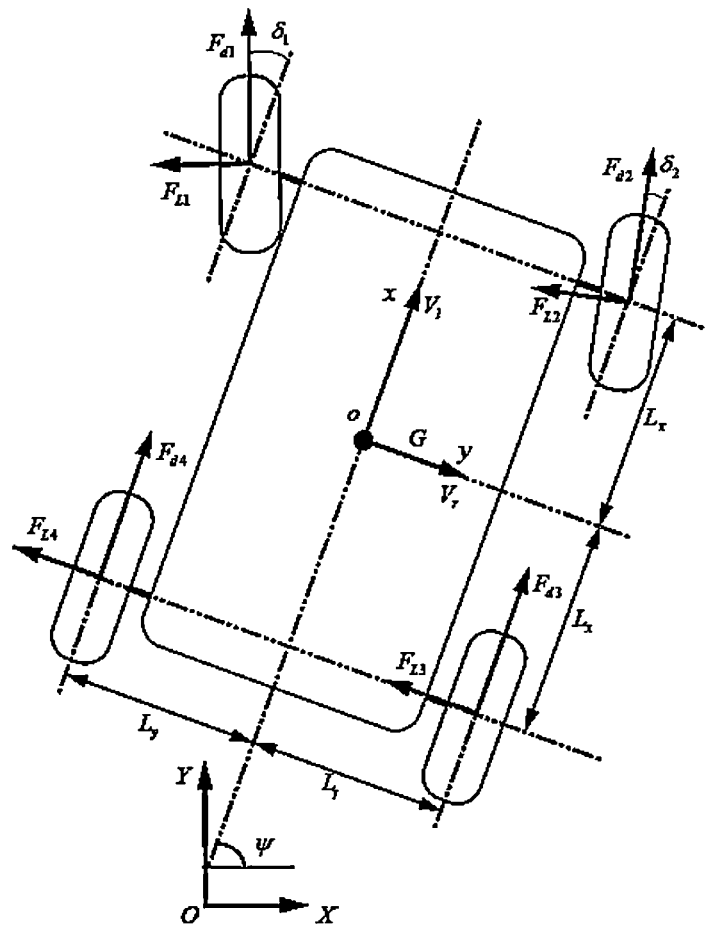
FIG. 5 is a top view of the vehicle mechanical model of the flying automobile in the touchdown state in an embodiment of the present invention.

The complexity of motion state control of the flying automobile in the touchdown state is mainly reflected in the influence by various forces during motion, such as ground contact force, friction force and disturbance force. These unpredictable forces bring challenges to the control work of the flying automobile. FIG. 4 shows a front view of a vehicle mechanical model of the flying automobile in the touchdown state, and FIG. 5 shows a top view of the vehicle mechanical model of the flying automobile in the touchdown state. A suspension of the flying automobile is described by using equivalent stiffness $K_x$ of the flying automobile around the x axis and equivalent damping $B_x$ of the flying automobile around the x axis. According to Newton's second law, the motion equation of the flying automobile in the touchdown state can be simply expressed as:

$$M\dot{V}_X = \sum_{i=1}^{4}(F_{di}\cos(\delta_i + \psi) - F_{Li}\sin(\delta_i + \psi)) - F_a\cos(\psi)$$

formula I

-continued $$M\dot{V}_Y = \sum_{i=1}^{4}(F_{di}\sin(\delta_i + \psi) + F_{Li}\cos(\delta_i + \psi)) - F_a\sin(\psi)$$

$$I_x\ddot{\phi} = -B_x\dot{\phi} - K_x\phi + M_sgh_s\sin\phi - M_S\sum_{i=1}^{4}(F_{di}\sin\delta_i + F_{Li}\cos\delta_i)h_s\cos\phi$$

$$I_z\ddot{\psi} = \sum_{i=1}^{4}L_{yi}(-F_{di}\cos\delta_i + F_{Li}\sin\delta_i) + L_{xi}(F_{di}\sin\delta_i + F_{Li}\cos\delta_i) - \sum_{i=1}^{4}M_{wi} - M_a.$$

In formula I, M is a mass of the flying automobile, is a sprung mass, g is a gravitational acceleration, $I_x$ is a rotational inertia around the x-axis of the flying automobile with respect to a center of mass, $I_x$ is a rotational inertia around the z-axis of the flying automobile with respect to the center of mass, $V_X$ is a velocity of the flying automobile in the x-axis direction, $V_Y$ is a velocity of the flying automobile in the y-axis direction, $\phi$ is a roll angle of the flying automobile around the x-axis, $\psi$ is a yaw angle of the flying automobile around the z-axis, $\delta_i$ is a tire steering angle, $F_{di}$ is a tire longitudinal force of the flying automobile, $F_{Li}$ is a tire lateral force of the flying automobile, $F_a$ is air resistance of the flying automobile during travel in the touchdown state, $K_x$ is the equivalent stiffness of the flying automobile around the x-axis, $B_x$ is the equivalent damping of the flying automobile around the x-axis, $h_s$ is a height from a center of gravity of the sprung mass to a center of gravity of the vehicle, $L_x$ is a distance of a tire from the center of the flying automobile in the x-axis direction, $L_y$ is a distance of the tire from the center of the flying automobile in the y-axis direction distance, i is a tire number, $M_W$ is a tire mass, and $M_a$ is an air resistance moment of the flying automobile traveling in the touchdown state.

The air resistance $F_a$ in the above-mentioned motion equation of the flying automobile in the touchdown state satisfies:

$$F_a = \tfrac{1}{2}C_D\rho_D A_D V^2$$

formula II.

In formula II, $\rho_a$ is an air density parameter, generally of 1.2258N·s²·m⁻⁴; $A_D$ is a windward area of the vehicle; $C_D$ represents an air resistance coefficient; and V is a velocity in a motion direction.

In description of the suspension of the flying automobile by using the equivalent stiffness $K_x$ of the flying automobile around the x-axis and the equivalent damping $B_x$ of the flying automobile around the x-axis, although the influence of the suspension on the attitude can be expressed simply and effectively, the displacements of each tire and the suspension cannot be known when the flying automobile is moving on the ground, and the motion states of each tire and the suspension during takeoff and landing of the flying automobile cannot be described.

The tire longitudinal force $F_{di}$ of the flying automobile in the above-mentioned motion equation of the flying automobile in the touchdown state satisfies:

$$F_{di} = \begin{cases} 10k_{di}F_{Ni}\alpha_i, & |\zeta_i| \le 0.1 \\ k_{di}F_{Ni}, & \zeta_i > 0.1 \\ k_{di}F_{Ni}, & \zeta_i < 0.1 \end{cases}$$

formula III

In formula III, $\alpha_i$ is a tire cornering angle, $k_{di}$ is a tire longitudinal slip stiffness coefficient, $F_{Ni}$ is a vertical load pressure of each tire, $\zeta_i$ is a tire longitudinal slip rate, and i is the tire number.

In view of the fact that an acting force between the tire and the ground is mainly generated by elastic deformation and local slip of the tire, thus in analysis of the tire longitudinal force, it is described by using the tire longitudinal slip rate $\zeta_i$ to facilitate its mathematical expression. The physical meaning of the tire longitudinal slip rate $\zeta_i$ is a ratio between a sliding velocity and an actual velocity during motion of the tire. The tire longitudinal slip rate $\zeta_i$ satisfies:

$$\zeta_i = \begin{cases} \dfrac{R_{wi}\omega_{wi} - v_{wi}}{R_{wi}\omega_i}, & R_{wi}\omega_{wi} \geq v_{wi} \\ \dfrac{R_{wi}\omega_{wi} - v_{wi}}{v_{wi}}, & R_{wi}\omega_{wi} < v_{wi} \end{cases}$$ formula IV In formula IV, $R_{wi}$ is a tire radius, $\omega_{wi}$ is a tire angular velocity, $v_{wi}$ is a tire cornering velocity, and i is the tire number.

The above-mentioned tire cornering velocity $v_{wi}$ satisfies:

$$v_{wi} = (V_l - \omega_{wi} \cdot L_x)\cos\delta_i + (V_r + \dot{\psi} \cdot L_y)\sin\delta_i \quad \text{formula V}$$

In formula V, $V_l$ is a longitudinal velocity of the vehicle, $V_r$ is a lateral velocity of the vehicle, $L_x$ is the distance of a tire from the center of the flying automobile in the x-axis direction, $L_y$ is the distance of a tire from the center of the flying automobile in the y-axis direction, $\omega_{wi}$ is the tire angular velocity, $\psi$ is the yaw angle of the flying automobile around the z-axis, $\delta_i$ is the tire steering angle, and i is the tire number.

The above-mentioned longitudinal velocity $V_l$ of the vehicle and lateral velocity $V_r$ of the vehicle satisfy:

$$V_l = V_X \cos(\psi) + V_Y \sin(\psi)$$

$$V_r = -X \sin(\psi) + V_Y \cos(\psi) \quad \text{formula VI}$$

In formula VI, $V_X$ is the velocity of the flying automobile in the x-axis direction, $V_Y$ is the velocity of the flying automobile in the y-axis direction, and $\psi$ is the yaw angle of the flying automobile around the z-axis.

When the flying automobile is in the touchdown state, and a traveling direction changes during traveling on the ground, the motion direction of a tire deviates from the direction of its rotation plane, which is a cornering phenomenon of the tire. In this case, the tire correspondingly slides laterally, thereby generating a corresponding frictional force with the ground, that is, the tire lateral force $F_{Li}$. The included angle $\alpha_i$ between an actual motion velocity of the tire and its rotation plane is the tire cornering angle. As the tire cornering angle can be calculated from a motion velocity of the flying automobile, the tire lateral force $F_{Li}$ in the above-mentioned motion equation of the flying automobile in the touchdown state satisfies:

$$F_{Li} = \begin{cases} k_{Li}F_{Ni}\alpha_i, & |\alpha_i| \leq 5 \\ 5F_{Ni}\alpha_i, & \alpha_i > 5 \\ -5F_{Ni}\alpha_i, & \alpha_i < -5 \end{cases} \quad \text{formula VII}$$

In formula VII, $k_{Li}$ is a tire lateral slip stiffness coefficient, $\alpha_i$ is the tire cornering angle, $F_{Ni}$ is the tire vertical load, and i is the tire number.

The tire vertical load $F_{Ni}$ in the tire longitudinal force $F_{di}$ and tire lateral force $F_{Li}$ described above can be expressed as:

$$F_{Ni} = Mg/4 - F_{iz} \quad \text{formula VIII.}$$

In formula VIII, $F_{iz}$ is a compensating force to the suspension, M is the mass of the flying automobile, g is the gravitational acceleration, and i is the tire number.

As the flying automobile often has a large angular attitude change during motion, $F_{iz}$ is used to describe the compensating force to the suspension due to a large attitude change, and the above-mentioned compensating force $F_{iz}$ to the suspension can be expressed as:

$$F_{iz} = [L_x \sin(\theta)k_{z2} + c_z\dot{\theta}] + [L_y \sin(\phi)k_{z2} + c_z\dot{\phi}] \quad \text{formula IX.}$$

In formula IX, $L_x$ and $L_y$ are the distances of a tire from the center of the flying automobile in the x-axis direction and in the y-axis direction, respectively, $K_{z2}$ is a suspension shock absorber stiffness, $c_z$ a suspension shock absorber damping coefficient, $\theta$ is the pitch angle of the flying automobile around the y-axis, and $\varphi$ is the roll angle of the flying automobile around the x-axis.

In view of the fact that the tire vertical load force $F_{Ni}$ is related to coordinates of each tire, the coordinates of each tire can be expressed as:

X-axis: $(X_t + \sin(\theta)h_s) \pm L_x \cos(\theta)$

Y-axis: $(Y_t + \sin(\theta)h_s) \pm L_y \cos(\phi)$

Z-axis: $(Z_t - \cos(\theta)\cos(\phi)h_s) \pm L_z \sin(\theta) \pm L_y \sin(\phi) - Z_{i1}$ formula X.

In formula X, $X_t$, $Y_t$ and $Z_t$ are x-axis, y-axis and z-axis coordinates of the flying automobile in a geodesic coordinate system at time t, $L_x$ is the distance of a tire from the center of the flying automobile in the x-axis direction, $L_y$ is the distance of the tires from the center of the flying automobile in the y-axis direction, $Z_{i1}$ is the vertical displacement of each tire, k is the height from the center of gravity of the sprung mass to the center of gravity of the vehicle, $\phi$ is the roll angle of the flying automobile around the x-axis, and $\theta$ is the pitch angle of the flying automobile around the y-axis.

As the coordinate origin of the flying automobile is at the center of gravity of the flying automobile, the tire is in the touchdown state when the Z-axis coordinate of each tire satisfies $(Z_t - \cos(\theta)\cos(\phi)h_s) \pm L_x \sin(\theta) \pm \sin(\phi) - Z_{i1} = h_{cg}$. In this case, the tire vertical load force $F_{Ni}$ can be expressed as:

$$F_{Ni} = \begin{cases} (Mg - \cos(\theta)\cos(\phi)u_1)/K_t + F_{iz} & \text{Touchdown state} \\ 0 & \text{Not touchdown} \end{cases} \quad \text{formula XI}$$

In formula XI, $h_{cg}$ is a height from the center of gravity of the flying automobile to the tire center, $F_{iz}$ is the compensating force to the suspension, M is the mass of the flying automobile, g is the gravitational acceleration, $\phi$ is the roll angle of the flying automobile around the x-axis, $\theta$ is the pitch angle of the flying automobile around the y-axis, $K_t$ is the number of tires that touch the ground at the time t, and $u_1$ is a dynamic input of vertical motion of the flying automobile in the flying state.

In view of this, in the embodiment of the present invention, the motion equation of the flying automobile in the touchdown state is corrected by the two-degree-of-freedom suspension dynamic equation, and an attitude motion equation of the flying automobile around the y-axis is additionally established to obtain the six-degree-of-freedom motion equation of the flying automobile in the touchdown state.

Figure 6:
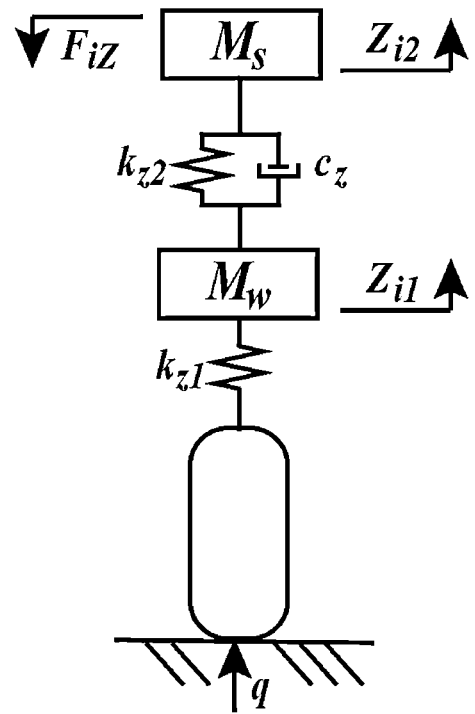
FIG. 6 is a diagram of a two-degree-of-freedom suspension dynamic model corresponding to tires of the flying automobile.

FIG. 6 shows a diagram of a two-degree-of-freedom suspension dynamic model corresponding to the tires of the flying automobile. The coordinate origin of the vertical displacement of the flying automobile is defined as an equilibrium position when the suspension is not subjected to forces, and the two-degree-of-freedom suspension dynamic equation satisfies:

$$M_w \ddot{z}_{i1} = -c_z(\dot{z}_{i1} - \dot{z}_{i2}) - k_{z2}(Z_{i1} - Z_{i2}) - k_{z1} Z_{i1} + q$$

$$M_s \ddot{z}_{i2} = -c_z(\dot{z}_{i2} - \dot{z}_{i1}) - k_{z2}(Z_{i2} - Z_{i1}) - F_{Ni} \quad \text{formula XII}.$$

In formula XII, $F_{Ni}$ is the vertical load of each tire, $M_w$ is the tire mass, $M_s$ is the sprung mass, $K_{z1}$ is a tire stiffness, $K_{z2}$ is the suspension shock absorber stiffness, $c_z$ is the suspension shock absorber damping coefficient, $Z_{i2}$ is the vertical displacement of the vehicle body corresponding to each tire, $Z_{i1}$ is the vertical displacement of each tire, q is an external excitation to the vehicle, and i is the tire number.

The above-mentioned six-degree-of-freedom motion equation of the flying automobile in the touchdown state satisfies:

$$M\dot{V}_X = \sum_{i=1}^{4}(F_{di}\cos(\delta_i + \psi) - F_{Li}\sin(\delta_i + \psi)) - F_a\cos(\psi) \quad \text{formula XIII}$$

$$M\dot{V}_Y = \sum_{i=1}^{4}(F_{di}\sin(\delta_i + \psi) + F_{Li}\cos(\delta_i + \psi)) - F_a\sin(\psi)$$

$$I_x\ddot{\phi} = M_s g h_s \sin\phi - \sum_{i=1}^{4}(F_{di}\sin\delta_i + F_{Li}\cos\delta_i)h_s\cos\phi +$$

$$\sum_{i=1}^{4} L_x\left[c_z(\dot{Z}_{i1} - \dot{Z}_{i2}) + k_{z2}(Z_{i1} - Z_{i2})\right]$$

$$I_y\ddot{\theta} = M_s g h_s \sin\theta - \sum_{i=1}^{4}(F_{di}\cos\delta_i - F_{Li}\sin\delta_i)h_s\cos\theta +$$

$$\sum_{i=1}^{4} L_y\left[c_z(\dot{Z}_{i1} - \dot{Z}_{i2}) + k_{z2}(Z_{i1} - Z_{i2})\right]$$

$$I_z\ddot{\psi} =$$

$$\sum_{i=1}^{4}(L_y(-F_{di}\cos\delta_i + F_{Li}\sin\delta_i) + L_x(F_{di}\sin\delta_i + F_{Li}\cos\delta_i)) -$$

$$M_a.$$

In formula XIII, M is the mass of the flying automobile, $M_s$ is the sprung mass, $I_x$ is the rotational inertia around the x-axis of the flying automobile with respect to the center of mass, $I_y$ is the rotational inertia around the y-axis of the flying automobile with respect to the center of mass, $I_z$ is the rotational inertia around the z-axis of the flying automobile with respect to the center of mass, $\phi$ is the roll angle of the flying automobile around the x-axis, $\theta$ is the pitch angle of the flying automobile around the y-axis, $\psi$ is the yaw angle of the flying automobile around the z-axis, $V_X$ is the velocity of the flying automobile in the x-axis direction, $V_Y$ is the velocity of the flying automobile in the y-axis direction, $F_{di}$ is the tire longitudinal force of the flying automobile, $F_{Li}$ is the tire lateral force of the flying automobile, $\delta_i$ is the tire steering angle, $F_a$ is the air resistance of the flying automobile traveling in the touchdown state, g is the gravitational acceleration, $h_s$ is the height from the center of gravity of the sprung mass to the center of gravity of the vehicle, $L_x$ is the distance of a tire from the center of the flying automobile in the x-axis direction, $L_y$ is the distance of the tire from the center of the flying automobile in the y-axis direction distance, $Z_{i2}$ is the vertical displacement of the vehicle body corresponding to each tire, $Z_{i1}$ is the vertical displacement of each tire, $M_a$ is the air resistance moment of the flying automobile traveling in the touchdown state, and i is the tire number.

The motion equation of the flying automobile in the touchdown state determined by the two-degree-of-freedom suspension dynamic equation and the six-degree-of-freedom motion equation of the flying automobile in the touchdown state described above satisfies:

$$M\dot{V}_X = \sum_{i=1}^{4}(F_{di}\cos(\delta_i + \psi) - F_{Li}\sin(\delta_i + \psi)) - F_a\cos(\psi) \quad \text{formula XIV}$$

$$M\dot{V}_Y = \sum_{i=1}^{4}(F_{di}\sin(\delta_i + \psi) + F_{Li}\cos(\delta_i + \psi)) - F_a\sin(\psi)$$

$$I_x\ddot{\phi} = M_s g h_s \sin\phi - \sum_{i=1}^{4}(F_{di}\sin\delta_i + F_{Li}\cos\delta_i)h_s\cos\phi +$$

$$\sum_{i=1}^{4} L_x\left[c_z(\dot{Z}_{i1} - \dot{Z}_{i2}) + k_{z2}(Z_{i1} - Z_{i2})\right]$$

$$I_y\ddot{\theta} = M_s g h_s \sin\theta - \sum_{i=1}^{4}(F_{di}\cos\delta_i - F_{Li}\sin\delta_i)h_s\cos\theta +$$

$$\sum_{i=1}^{4} L_y\left[c_z(\dot{Z}_{i1} - \dot{Z}_{i2}) + k_{z2}(Z_{i1} - Z_{i2})\right]$$

$$I_z\ddot{\psi} =$$

$$\sum_{i=1}^{4}(L_y(-F_{di}\cos\delta_i + F_{Li}\sin\delta_i) + L_x(F_{di}\sin\delta_i + F_{Li}\cos\delta_i)) -$$

$$M_a$$

$$M_w \ddot{z}_{i1} = -c_z(\dot{z}_{i1} - \dot{z}_{i2}) - k_{z2}(z_{i1} - z_{i2}) - k_{z1} z_{i1} + q$$

$$M_s \ddot{z}_{i2} = -c_z(\dot{z}_{i2} - \dot{z}_{i1}) - k_{z2}(z_{i2} - z_{i1}) - F_{Ni}.$$

In formula XIV, M is the mass of the flying automobile, $M_S$ is the sprung mass, $M_W$ is the tire mass, $I_x$ is the rotational inertia around the x-axis of the flying automobile with respect to the center of mass, $I_y$ is the rotational inertia around the y-axis of the flying automobile with respect to the center of mass, $I_z$ is the rotational inertia around the z-axis of the flying automobile with respect to the center of mass, $\phi$ is the roll angle of the flying automobile around the x-axis, $\theta$ is the pitch angle of the flying automobile around the y-axis, $\psi$ is the yaw angle of the flying automobile around the z-axis, $V_X$ is the velocity of the flying automobile in the x-axis direction, $V_Y$ is the velocity of the flying automobile in the y-axis direction, $F_{di}$ is the tire longitudinal force of the flying automobile, $F_{Li}$ is the tire lateral force of the flying automobile, $\delta_i$ is the tire steering angle, $F_a$ is the air resistance of the flying automobile traveling in the touchdown state, g is the gravitational acceleration, $h_s$ is the height from the center of gravity of the sprung mass to the center of gravity of the vehicle, $L_x$ is the distance of a tire from the center of the flying automobile in the x-axis direction, $L_y$ is the distance of the tire from the center of the flying automobile in the y-axis direction distance, $Z_{i2}$ is the vertical displacement of the vehicle body corresponding to each tire, $Z_{i1}$ is the vertical displacement of each tire, $M_a$ is the air resistance moment of the flying automobile traveling in the touchdown state, $K_{z1}$ is the tire stiffness, $K_{z2}$ is the suspension shock absorber stiffness, $c_z$ is the suspension shock absorber damping coefficient, q is the external excitation to the vehicle, $Z_{i2}$ is the vertical displacement of the vehicle body corresponding to each tire, $Z_{i1}$ is the vertical displacement of each tire, $F_{Ni}$ is the vertical load pressure of the tire, and i is the tire number.

To enable the above-mentioned coupled dynamic model of the flying automobile to be used for both motion state control of the flying automobile in the touchdown state and motion state control of the flying automobile in the flying state, a motion equation of the flying automobile in the flying state can be added to the coupled dynamic model of the flying automobile. In this case, in addition to the motion equation of the flying automobile in the touchdown state, the coupled dynamic model of the flying automobile also includes the motion equation of the flying automobile in the flying state. The motion equation of the flying automobile in the flying state satisfies:

$$m\dot{V}_X = -K_1 V_X - (\cos\psi \sin\theta \cos\phi + \sin\psi \sin\phi) \cdot u_1$$

$$m\dot{V}_Y = -K_2 V_Y - (\sin\psi \sin\theta \cos\phi - \cos\psi \sin\phi) \cdot u_1$$

$$m\dot{V}_Z = -K_3 V_Z - mg + \cos\phi \cos\theta \cdot u_1$$

$$I_x \ddot{\phi} = -K_4 l \dot{\phi} + l \cdot u_2$$

$$I_y \ddot{\theta} = -K_5 l \dot{\theta} + l \cdot u_3$$

$$I_z \ddot{\psi} = -K_6 \dot{\psi} + c \cdot u_4 \qquad \text{formula XV}$$

In formula XV, m is a mass of the aircraft, g is the gravitational acceleration, $V_X$ is the velocity of the flying automobile in the x-axis direction, $V_Y$ is the velocity of the flying automobile in the y-axis direction, $V_Z$ is the velocity of the flying automobile in the z-axis direction, $I_x$ is the rotational inertia around the x-axis of the flying automobile with respect to the center of mass, $I_y$ is the rotational inertia around the y-axis of the flying automobile with respect to the center of mass, $I_z$ is the rotational inertia around the z-axis of the flying automobile with respect to the center of mass, $\phi$ is the roll angle of the flying automobile around the x-axis, $\theta$ is the pitch angle of the flying automobile around the y-axis, $\psi$ is the yaw angle of the flying automobile around the z-axis, $K_i(i=1 \ldots 6)$ is an aerodynamic damping parameter, l is a distance from the center of the aircraft to a propeller axis, c is a conversion constant between a force and a moment. $u_1$ is the dynamic input of vertical motion of the flying automobile in the flying state, $u_2$ is a dynamic input of roll motion of the flying automobile in the flying state, $u_3$ is a dynamic input of pitch motion of the flying automobile in the flying state, and $u_4$ is a dynamic input of yaw motion of the flying automobile in the flying state.

In the flying state, the flying automobile is driven by the aircraft, so dynamic parameters of the above-mentioned motion equation of the flying automobile in the flying state are $u_1$, $u_2$, $u_3$, and $u_4$. In this case, $u_1$ is a dynamic input of vertical motion of the aircraft, $u_2$ is a dynamic input of roll motion of the aircraft, $u_3$ is a dynamic input of pitch motion of the aircraft, and $u_4$ is a dynamic input of yaw motion of the aircraft.

Figure 7:
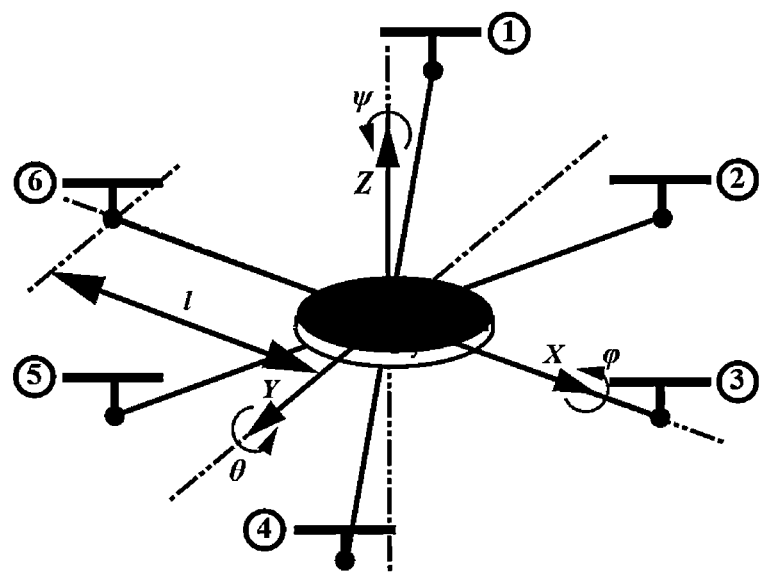
FIG. 7 is a schematic diagram of a mechanical model of an aircraft in an embodiment of the present invention.

Exemplarily, as shown in FIG. 7, if the aircraft is a six-rotor aircraft, six rotors of the six-rotor aircraft are arranged at the vertex position of a hexagon, and tensile forces of the six rotors are used as maneuvering forces. The six rotors may be designed to rotate in different directions, and the attitude and position of the six-rotor aircraft are changed by changing rotational speeds of the rotors. A body coordinate system is defined such that an x-axis is in a left-right symmetry plane of the aircraft body and points to the direction of the head, a z-axis of the body is in a left-right symmetry plane of the body and points from the center of the body to the top of the body, and forms an included angle of 90° with the x-axis, and a y-axis of the body is perpendicular to the xz plane and points to the right side of the body. As shown in FIG. 6, rotors 1, 3 and 5 rotate counterclockwise as "counter-clockwise blades", and rotors 2, 4 and 6 rotate clockwise as "clockwise blades". A red coordinate system in the center is the body coordinate system. It is just the differential matching of the rotational speeds of the six rotor that enables variations of flight actions of the aircraft. There are mainly four types of flight actions of the aircraft.

Vertical motion: By changing a throttle command signal to cause the rotational speeds of the six rotors to increase or decrease at the same time, upward or downward longitudinal motion of the aircraft relative to the geodesic coordinate system can be achieved, and especially when a lift provided by the six rotors is equal to the gravity of the aircraft, the aircraft is in a hovering flying state, which is denoted as u(1).

Roll motion: when a roll command signal is generated, the rotational speeds of the rotors 1, 3 and 5 increase (or decrease), while the rotational speeds of the rotors 2, 4 and 6 decrease (or increase). As aerodynamic moments on both sides of the aircraft body cannot be offset, a rolling moment relative to a body axis is generated, causing roll motion of the aircraft along the x-axis direction of the body, which is denoted as u(2).

Pitch motion: when a pitch command signal is generated, the rotational speeds of the rotors 1 and 2 increase (or decrease), while the rotational speeds of the rotors 4 and 5 decrease (or increase) and the rotational speeds of the rotors 3 and 6 remain unchanged, thereby generating a pitch moment relative to the body axis and causing pitch motion of the aircraft. When the pitch motion is generated, it also causes horizontal motion of the aircraft in a horizontal plane along the y-axis direction of the body, which is denoted as u(3).

Yaw motion: when a reaction torque generated by the three rotors rotating clockwise and a reaction torque generated by the three rotors rotating counter-clockwise cannot be offset, a yaw moment is generated to cause yaw motion of the aircraft. When there is a yaw command signal, the rotational speeds of the rotors 1, 3 and 5 (counter-clockwise blades) increase (or decrease), while the rotational speeds of the rotors 2, 4 and 6 (clockwise blades) decrease (or increase), the magnitudes of the reaction torques generated by the counter-clockwise blades and the clockwise blades are different, thereby generating a yaw moment around the z-axis of the body and causing yaw motion of the aircraft, which is denoted as u(4).

$u_1$, $u_2$, $u_3$, and $u_4$ in the above-mentioned motion equation of the flying automobile in the flying state satisfy:

$$\begin{bmatrix} u(1) \\ u(2) \\ u(3) \\ u(4) \end{bmatrix} = \qquad \text{formula XVI}$$

$$c_\Omega \cdot \begin{bmatrix} 1 & 1 & 1 & 1 & 1 & 1 \\ -\sin\alpha & \sin\alpha & -1 & \sin\alpha & -\sin\alpha & 1 \\ -\cos\alpha & -\cos\alpha & 0 & \cos\alpha & \cos\alpha & 0 \\ 1 & -1 & 1 & -1 & 1 & -1 \end{bmatrix} \begin{bmatrix} \Omega_1^2 \\ \Omega_2^2 \\ \Omega_3^2 \\ \Omega_4^2 \\ \Omega_5^2 \\ \Omega_6^2 \end{bmatrix}.$$

In formula XVI, $c_\alpha = 3.5 \times 10^{-5}$ is a conversion coefficient between a rotational speed and a thrust, $\alpha = 30°$ is half of a mounting angle of each arm, $\Omega_i$ (i=1 . . . 6) is the rotational speed of each rotor, and i is a rotor number.

The coupled dynamic model of the flying automobile can be determined by using the motion equation of the flying automobile in the flying state and the motion equation of the flying automobile in the touchdown state described above.

Figure 8:
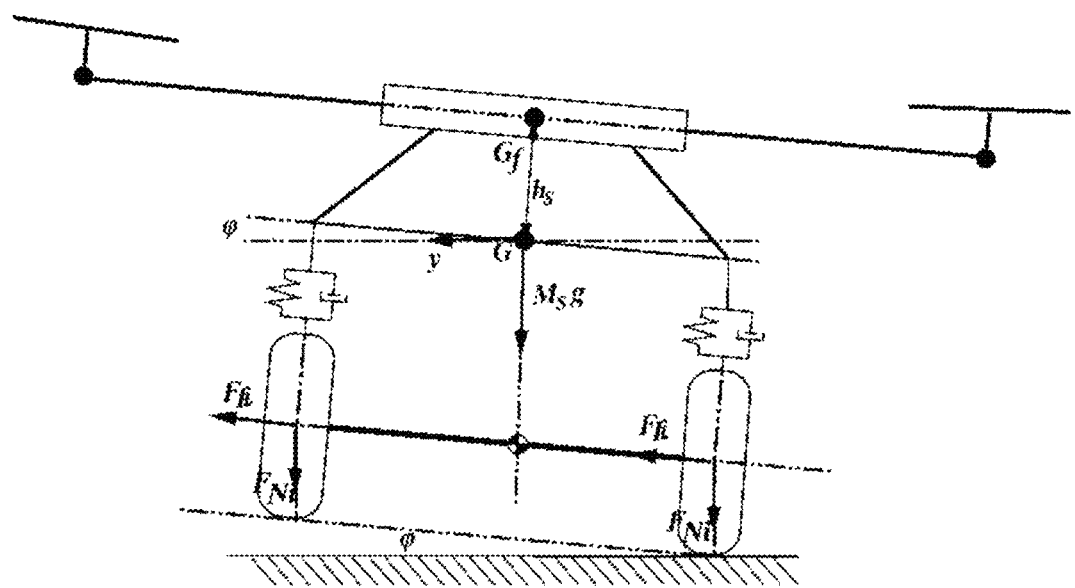
FIG. 8 is a front view of a dynamic model of the flying automobile in an embodiment of the present invention.
Figure 9:
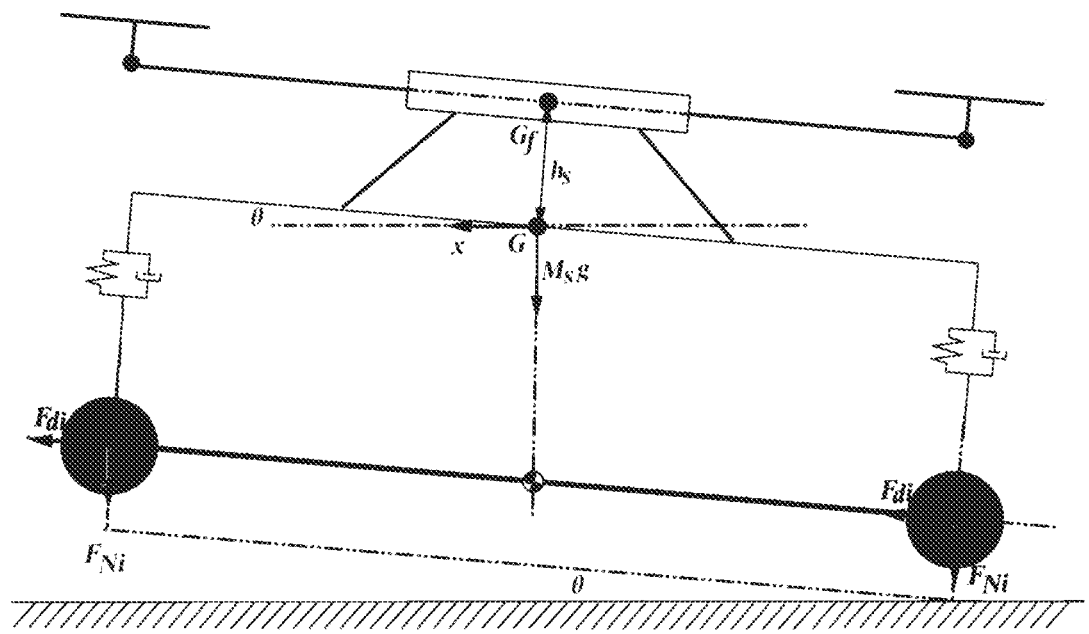
FIG. 9 is a side view of the dynamic model of the flying automobile in an embodiment of the present invention.

FIG. 8 shows a front view of the dynamic model of the flying automobile, and FIG. 9 shows a side view of the dynamic model of the flying automobile, and the coupled dynamic model of the flying automobile satisfies:

formula XVII $$M\dot{V}_X = \sum_{i=1}^{4}(F_{di}\cos(\delta_i + \psi) - F_{Li}\sin(\delta_i + \psi)) -$$
$$F_a\cos(\psi) - K_1\dot{V}_X - (\cos\psi\sin\theta\cos\phi + \sin\psi\sin\phi) \cdot u_1$$

$$M\dot{V}_Y = \sum_{i=1}^{4}(F_{di}\sin(\delta_i + \psi) + F_{Li}\cos(\delta_i + \psi)) -$$
$$F_a\sin(\psi) - K_2\dot{V}_Y - (\sin\psi\sin\theta\cos\phi - \cos\psi\sin\phi) \cdot u_1$$

$$M_s\dot{V}_Z = F_N - Mg - K_3\dot{V}_Z + \cos\phi\cos\theta \cdot u_1$$

$$I_x\ddot{\phi} = M_sgh_s\sin\phi - \sum_{i=1}^{4}(F_{di}\sin\delta_i + F_{Li}\cos\delta_i)h_s\cos\phi - K_4l\dot{\phi} +$$
$$l \cdot u_2 + \sum_{i=1}^{4}L_x[c_z(\dot{Z}_{i1} - \dot{Z}_{i2}) + k_{z2}(Z_{i1} - Z_{i2})]$$

$$I_y\ddot{\theta} = M_sgh_s\sin\theta - \sum_{i=1}^{4}(F_{di}\cos\delta_i - F_{Li}\sin\delta_i)h_s\cos\theta - K_5l\dot{\theta} +$$
$$l \cdot u_3 + \sum_{i=1}^{4}L_y[c_z(\dot{Z}_{i1} - \dot{Z}_{i2}) + k_{z2}(Z_{i1} - Z_{i2})]$$

$$I_z\ddot{\psi} = \sum_{i=1}^{4}(L_y(-F_{di}\cos\delta_i + F_{Li}\sin\delta_i) +$$
$$L_x(F_{di}\sin\delta_i + F_{Li}\cos\delta_i)) - M_a - K_6\dot{\psi} + c \cdot u_4$$

$$M_w\ddot{z}_{i1} = -c_z(\dot{z}_{i1} - \dot{z}_{i2}) - k_{z2}(z_{i1} - z_{i2}) - k_{z1}z_{i1} + q$$

$$M_s\ddot{z}_{i2} = -c_z(\dot{z}_{i2} - \dot{z}_{i1}) - k_{z2}(z_{i2} - z_{i1}) - F_{Ni}.$$

In formula XVII, M is the mass of the flying automobile, $M_S$ is the sprung mass, $M_W$ is the tire mass, $M_a$ is the air resistance moment of the flying automobile traveling in the touchdown state, $I_x$ is the rotational inertia around the x-axis of the flying automobile with respect to the center of mass, $I_y$ is the rotational inertia around the y-axis of the flying automobile with respect to the center of mass, $I_z$ is the rotational inertia around the z-axis of the flying automobile with respect to the center of mass, $K_1$, $K_2$, $K_3$, $K_4$, K5, and $K_6$ are aerodynamic damping parameters of the flying automobile in six degrees of freedom, respectively, l is the distance from the center of the aircraft to the propeller axis, c is the conversion constant between a force and a moment, $V_X$ the velocity of the flying automobile in the x-axis direction, $V_Y$ the velocity of the flying automobile in the y-axis direction, $V_Z$ the velocity of the flying automobile in the z-axis direction, $\phi$ is the roll angle of the flying automobile around the x-axis, $\theta$ is the pitch angle of the flying automobile around the y-axis, $\psi$ is the yaw angle of the flying automobile around the z-axis, $\delta_i$ is the tire steering angle, $F_{di}$ is the tire longitudinal force of the flying automobile, $F_{Li}$ is the tire lateral force of the flying automobile, $F_{Ni}$ is the tire vertical load, $F_N$ is the sum of tire vertical loads, $F_a$ is the air resistance of the flying automobile traveling in the touchdown state, g is the gravitational acceleration, $K_{z1}$ is the tire stiffness, $K_{z2}$ is the suspension shock absorber stiffness, $c_z$ is the suspension shock absorber damping coefficient, $Z_{i2}$ is the vertical displacement of the body corresponding to each tire, $Z_{i1}$ is the vertical displacement of each tire, q is the external excitation to the vehicle, $h_s$ is the height from the center of gravity of the sprung mass to the center of gravity of the vehicle, $L_x$ is the distance of a tire from the center of the flying automobile in the x-axis direction, $L_y$ is the distance of the tire from the center of flying automobile in the y-axis direction distance, $u_1$ is the dynamic input of vertical motion of the flying automobile in the flying state, $u_2$ is the dynamic input of roll motion of the flying automobile in the flying state, $u_3$ is the dynamic input of pitch motion of the flying automobile in the flying state, and $u_4$ is the dynamic input of yaw motion of the flying automobile in the flying state, and i is the tire number.

Figure 10:
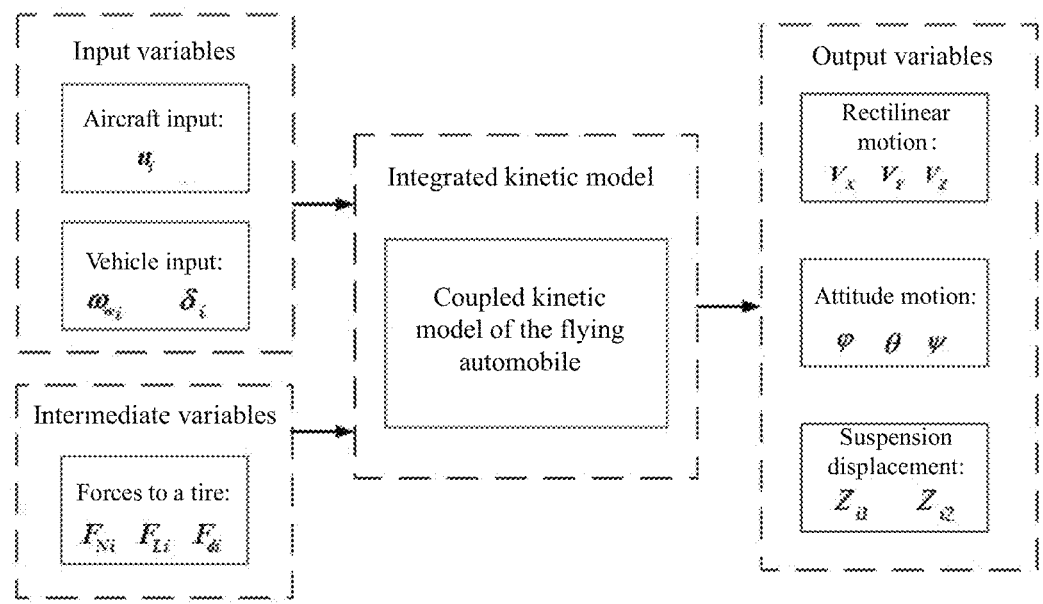
FIG. 10 is an operation diagram of the coupled dynamic model of the flying automobile in an embodiment of the present invention.

As shown in FIG. 10, in practical applications, the angular velocity $\omega_{wi}$ of each tire, the steering angle $\delta_i$ of each tire, and the flight dynamic parameters $u_1$, $u_2$, $u_3$ and $u_4$ are input to the above-mentioned coupled dynamic model of the flying automobile to output the motion parameters of six degrees of freedom of the flying automobile $V_X$, $V_Y$, $V_Z$, $\phi$, $\theta$ and $\psi$, the vertical displacement $Z_{i1}$ of each tire of the flying automobile, and the vertical displacement $Z_{i2}$ of the body corresponding to each tire of the flying automobile.

In the process that the coupled dynamic model of the flying automobile processes the dynamic parameters and outputs the dynamic control parameters of the flying automobile, the dynamic parameters are input variables to the coupled dynamic model of the flying automobile, the dynamic control parameters of the flying automobile are output variables of the coupled dynamic model of the flying automobile, and the tire longitudinal force $F_{di}$ of the flying automobile, the tire lateral force $F_{Li}$ of the flying automobile, and the tire vertical load $F_{Ni}$ are all intermediate variables.

Step 130: controlling, by the terminal device, takeoff and landing of the flying automobile according to the dynamic control parameters of the flying automobile.

In the takeoff and landing control method of a flying automobile provided in the embodiment of the present invention, the motion equation of the flying automobile in the touchdown state determined by the two-degree-of-freedom suspension dynamic equation and the six-degree-of-freedom motion equation of the flying automobile in the touchdown state not only can accurately describe the motion state on six degrees of freedom during takeoff and landing of the flying automobile, but also can accurately describe the motion state on two degrees of freedom (vertical direction) of the suspension during takeoff and landing of the flying automobile. In this case, the motion states in the vertical direction of the tires and vehicle body connected to the suspension can be determined from the motion state in the vertical direction of the suspension, so that the motion state on the six degrees of freedom of the flying automobile and the motion states in the vertical direction of the tires, the suspension and the vehicle body can be controlled during takeoff and landing by using the coupled dynamic model of the flying automobile containing the motion equation of the flying automobile in the touchdown state, to achieve the purpose of precisely controlling the motion state of the flying automobile during takeoff and landing to avoid accidents.

In practical applications, the motion state of the flying automobile during takeoff and landing can be controlled according to the relationship between the dynamic parameters of the flying automobile and the dynamic control parameters of the flying automobile.

For example, the angular velocity of a tire and the steering angle of the tire are adjusted according to the vertical displacement of the tire output from the coupled dynamic model of the flying automobile to obtain an ideal vertical displacement of the tire.

As another example, the tire angular velocity and the flight dynamic parameters u1, u2, u3, and u4, etc. are adjusted according to the velocity $V_x$ of the flying automobile in the x-axis direction output by the coupled dynamic model of the flying automobile to obtain an ideal velocity $V_x$ of the flying automobile in the x-axis direction.

To verify the reliability of the above-mentioned coupled dynamic model of the flying automobile, a coupled dynamic model of a flying automobile composed of a six-rotor aircraft and a four-wheeled automobile is established in a Simulink module of MATLAB software by using an Intel 15-7400 processor, and an embodiment simulation experiment is performed by calculation using an ode-45 algorithm. Since the coupling of the parts of the flying automobile is obvious during landing, considering practical use of the flying automobile, the following four embodiments are carried out: an experiment of only traveling on the ground, an experiment of only flying in the air, an experiment of two-wheel touchdown after takeoff and an experiment of single-wheel touchdown after takeoff. The four embodiments are used to verify the reliability of the coupled dynamic model of the flying automobile of the embodiments of the present invention. Parameters used in the following embodiments are shown in Table 1.

TABLE 1

Table of parameters in embodiments

| Variable | Magnitude | Unit | Variable | Magnitude | Unit |
|---|---|---|---|---|---|
| $L_x$ | 0.3 | m | $L_y$ | 0.2 | m |
| $R_w$ | 0.1 | m | $M_s$ | 20 | kg |
| $h_s$ | 0.2 | m | $h_{cg}$ | 0.2 | m |
| $K_{z1}$ | 20000 | m/N | $K_{z1}$ | 1500 | m/N– |
| $c_z$ | 150 | — | $M_w$ | 1 | kg |
| l | 1 | m | $M_s$ | 10 | kg |
| $k_1 = k_2 = k_3$ | 0.001 | Ns/m | $k_1 = k_2 = k_3$ | 0.0012 | Ns/m |
| c | 0.25 | — | $I_y$ | 120 | — |
| $I_x$ | 80 | — | M | 30 | kg |
| $I_z$ | 120 | — | | | |

(1) Embodiment of Only Traveling on the Ground

Figure 11:
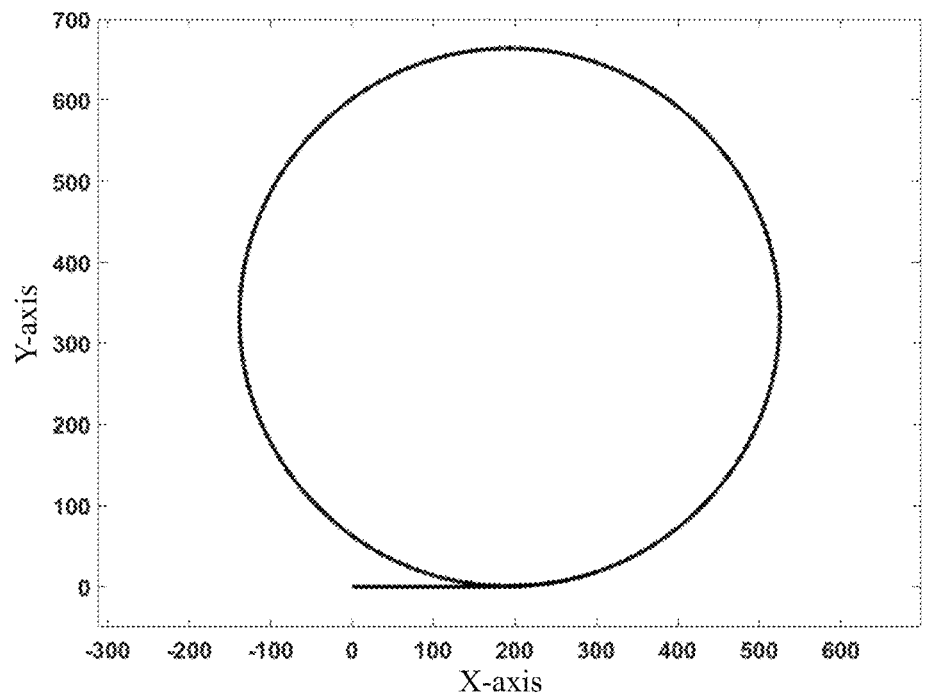
FIG. 11 shows a plane mapping trajectory of the flying automobile during traveling on the ground only of the flying automobile in an embodiment of the present invention.
Figure 12:
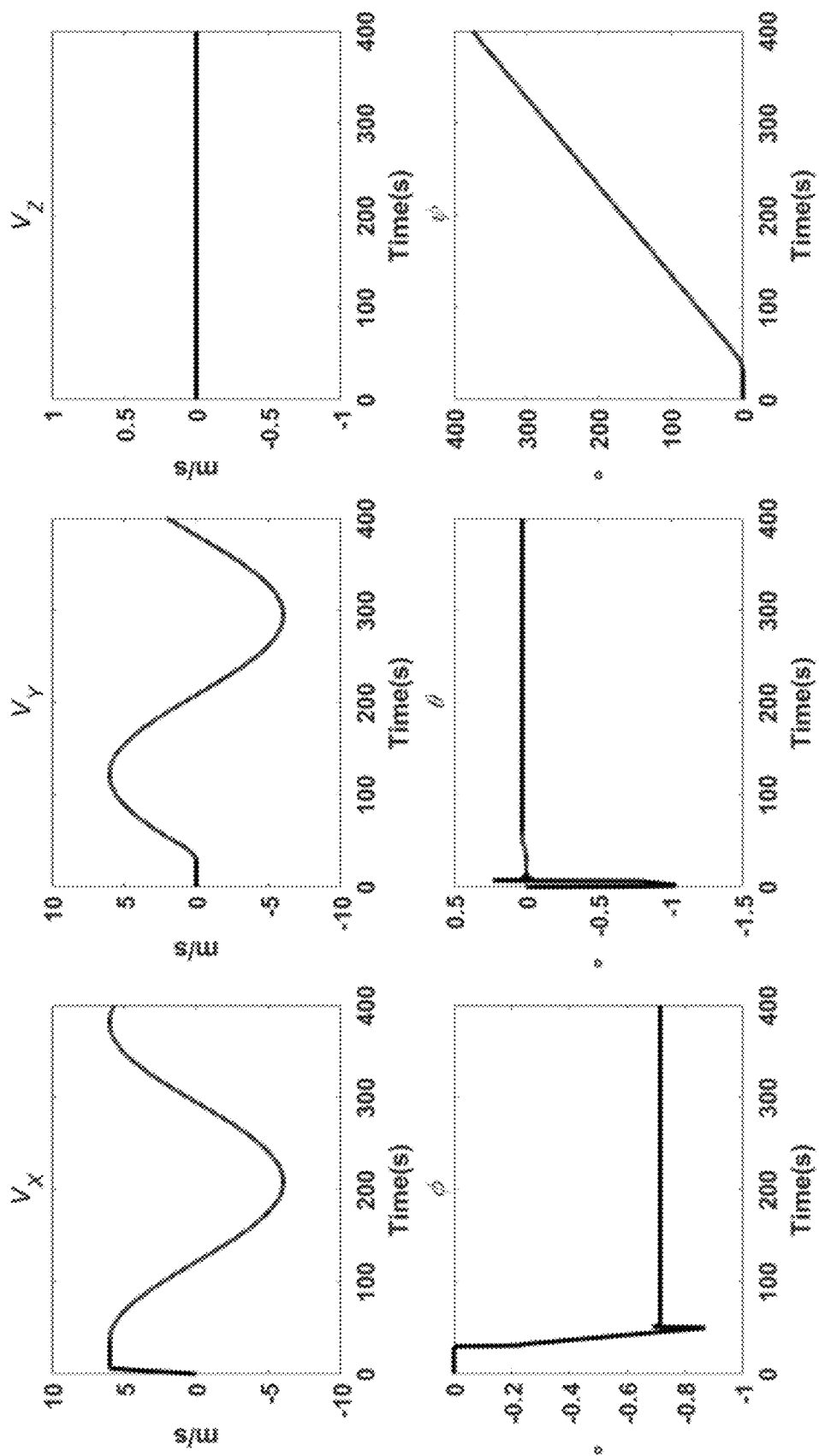
FIG. 12 shows output variable curves during traveling on the ground only of the flying automobile in an embodiment of the present invention.
Figure 13:
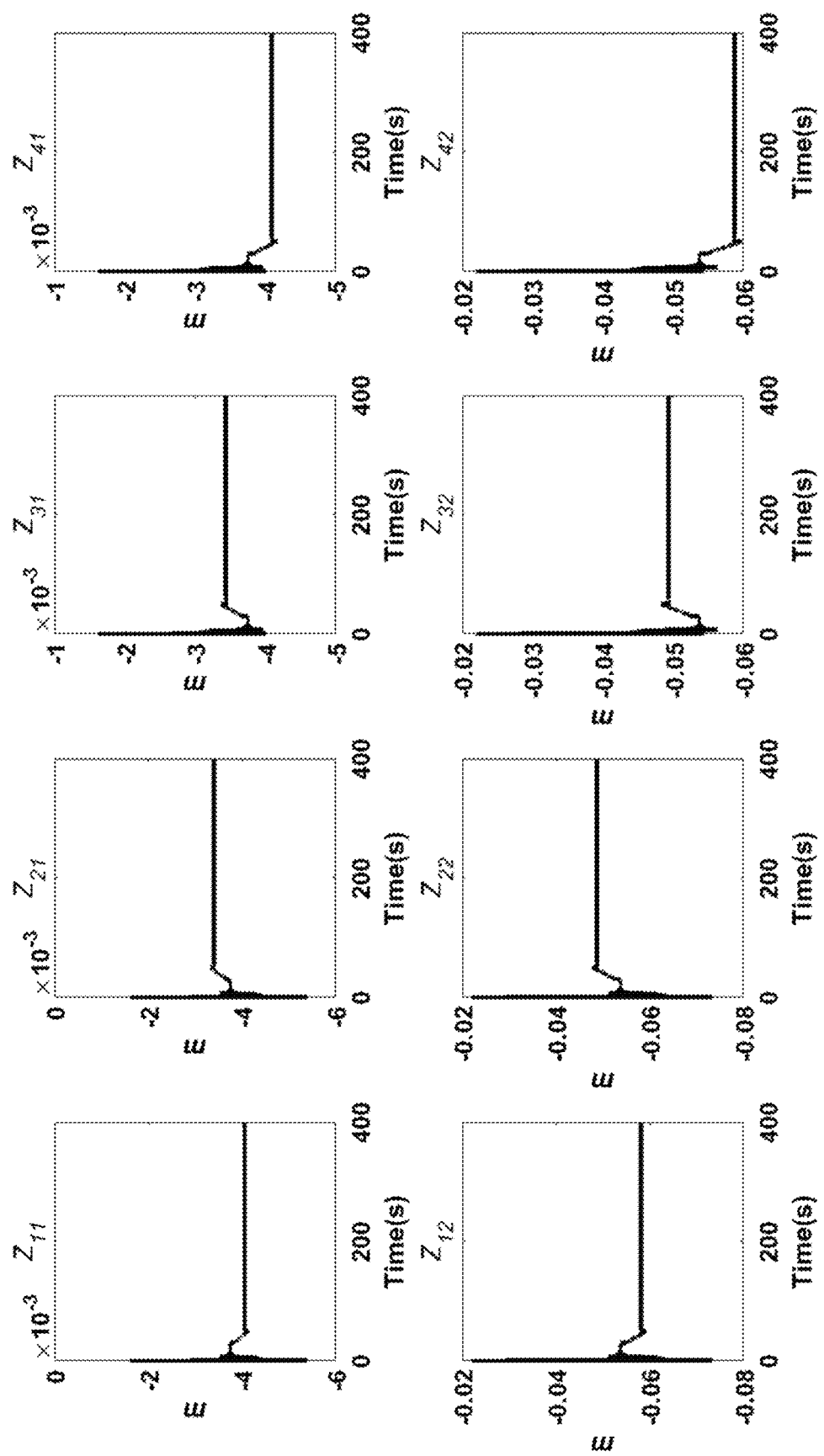
FIG. 13 shows suspension displacement curves during traveling on the ground only of the flying automobile in an embodiment of the present invention.
Figure 14:
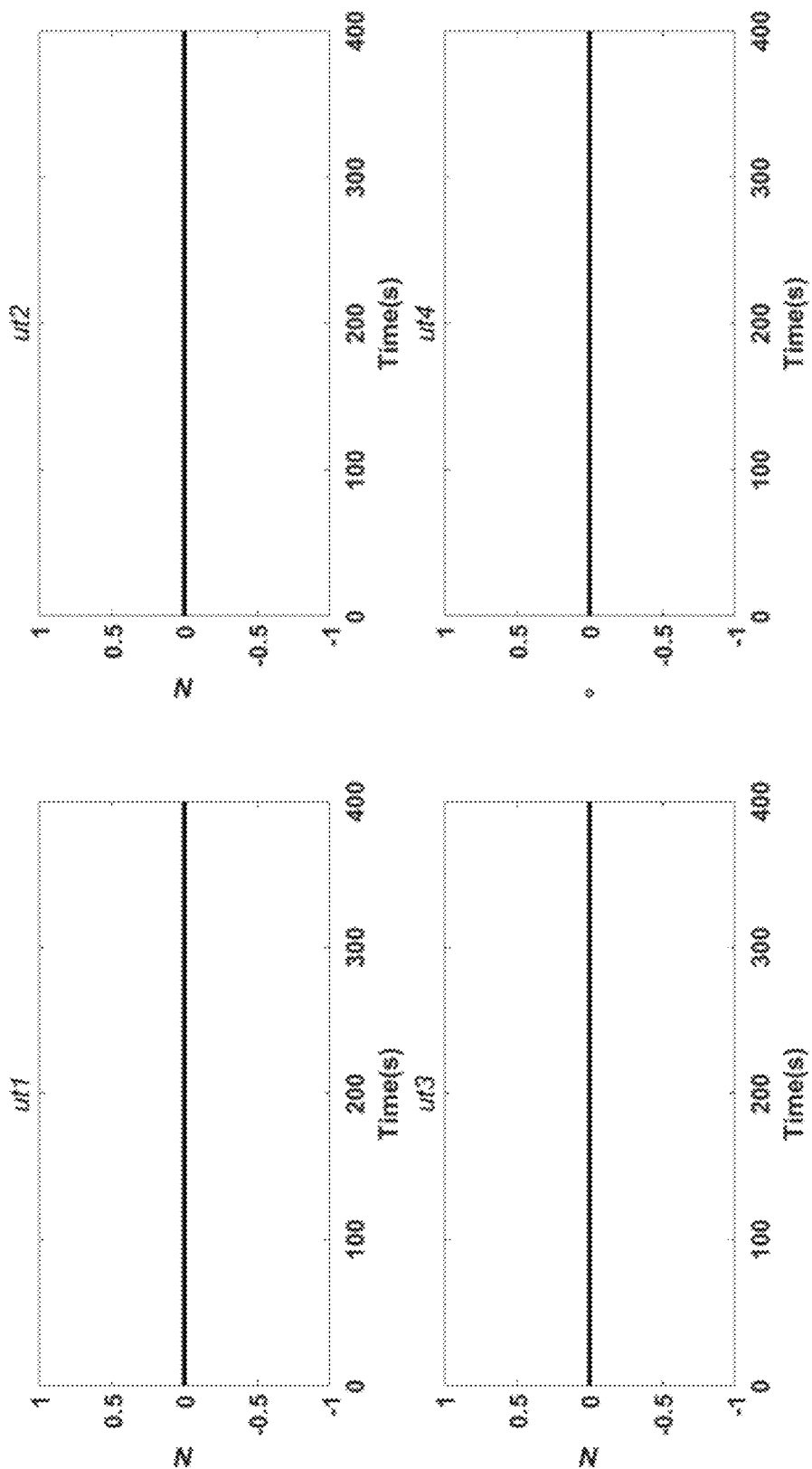
FIG. 14 shows flight dynamic parameter curves during traveling on the ground only of the flying automobile in an embodiment of the present invention.
Figure 15:
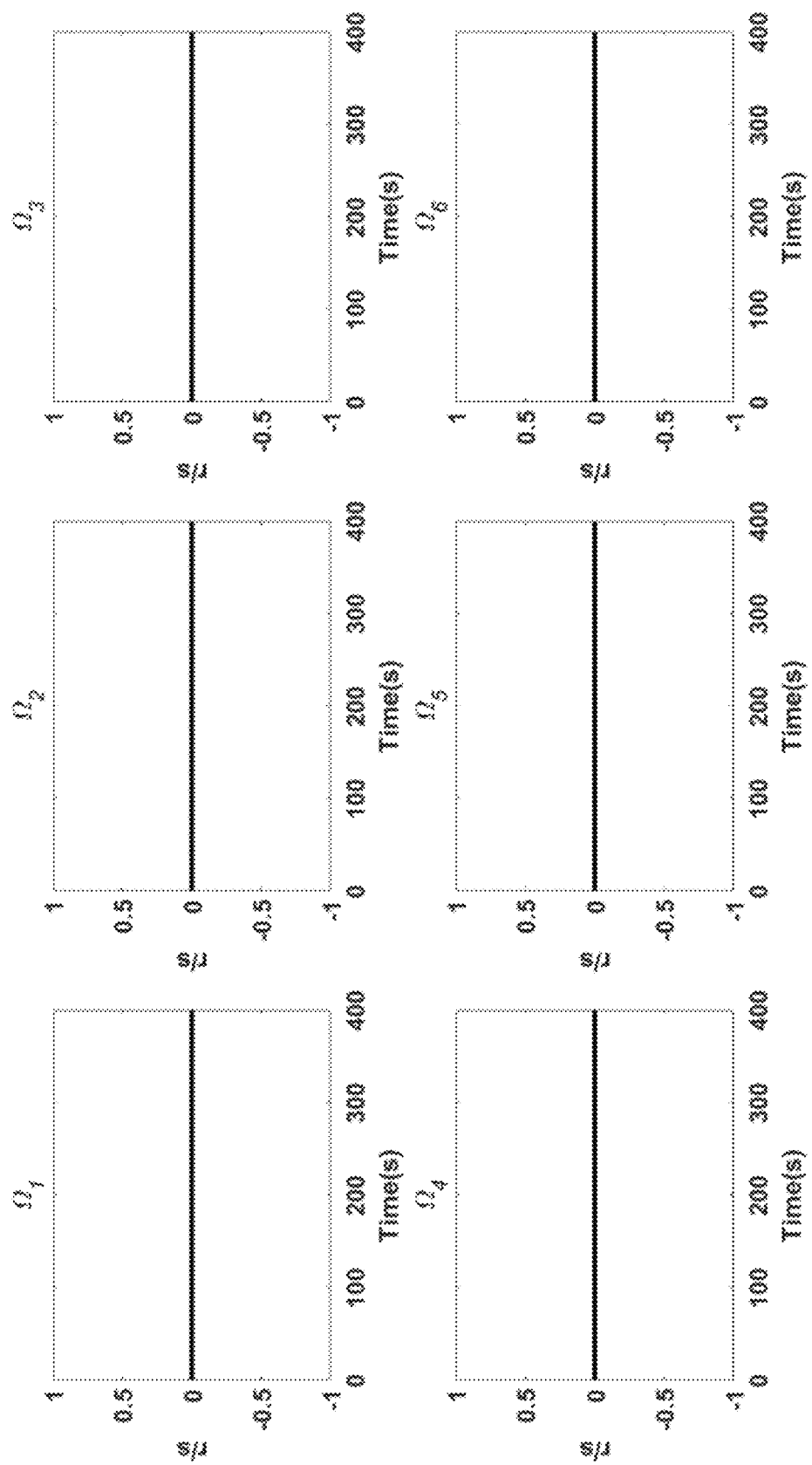
FIG. 15 shows rotational speeds of an aircraft propeller during traveling on the ground only of the flying automobile in an embodiment of the present invention.
Figure 16:
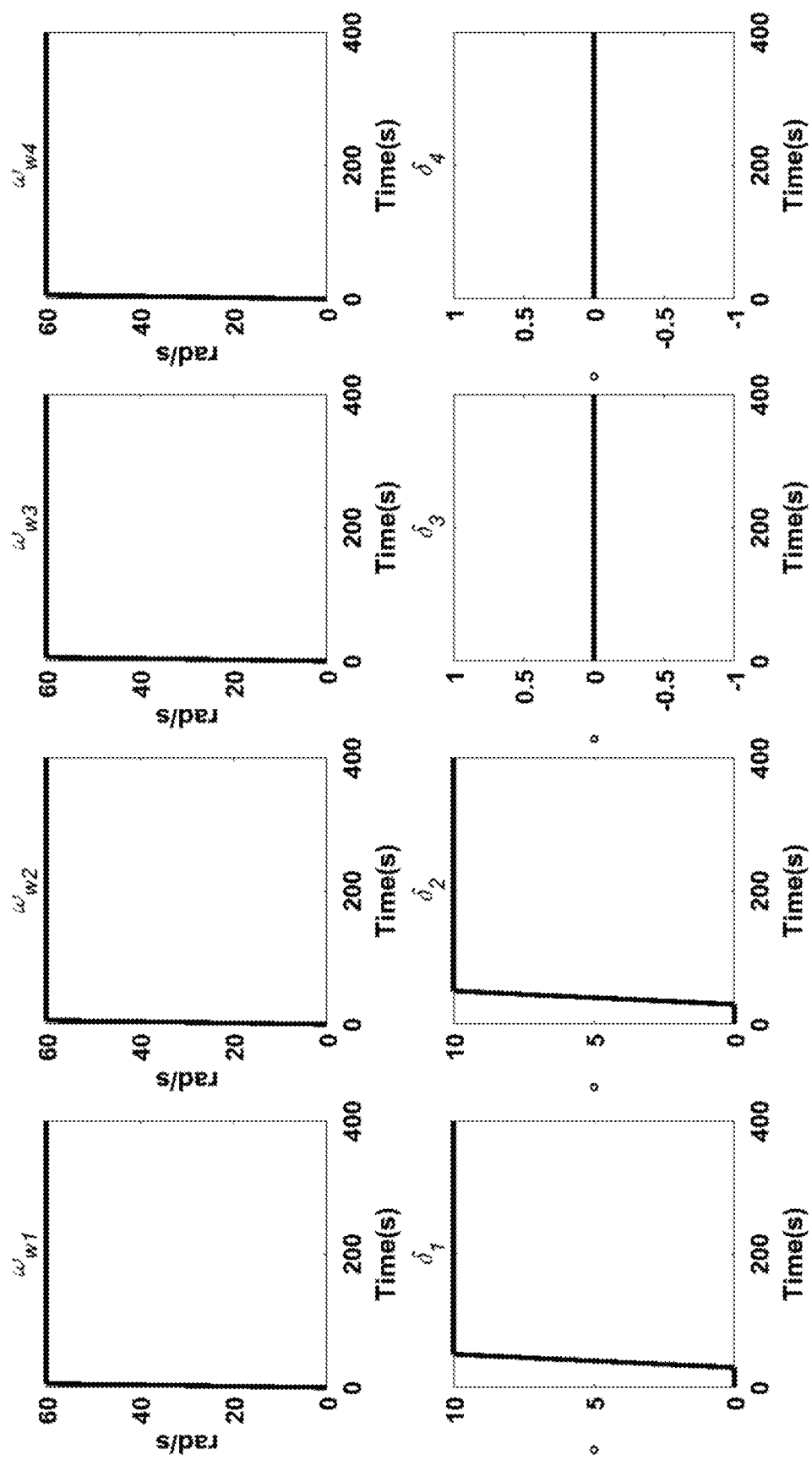
FIG. 16 shows vehicle input variable curves during traveling on the ground only of the flying automobile in an embodiment of the present invention.
Figure 17:
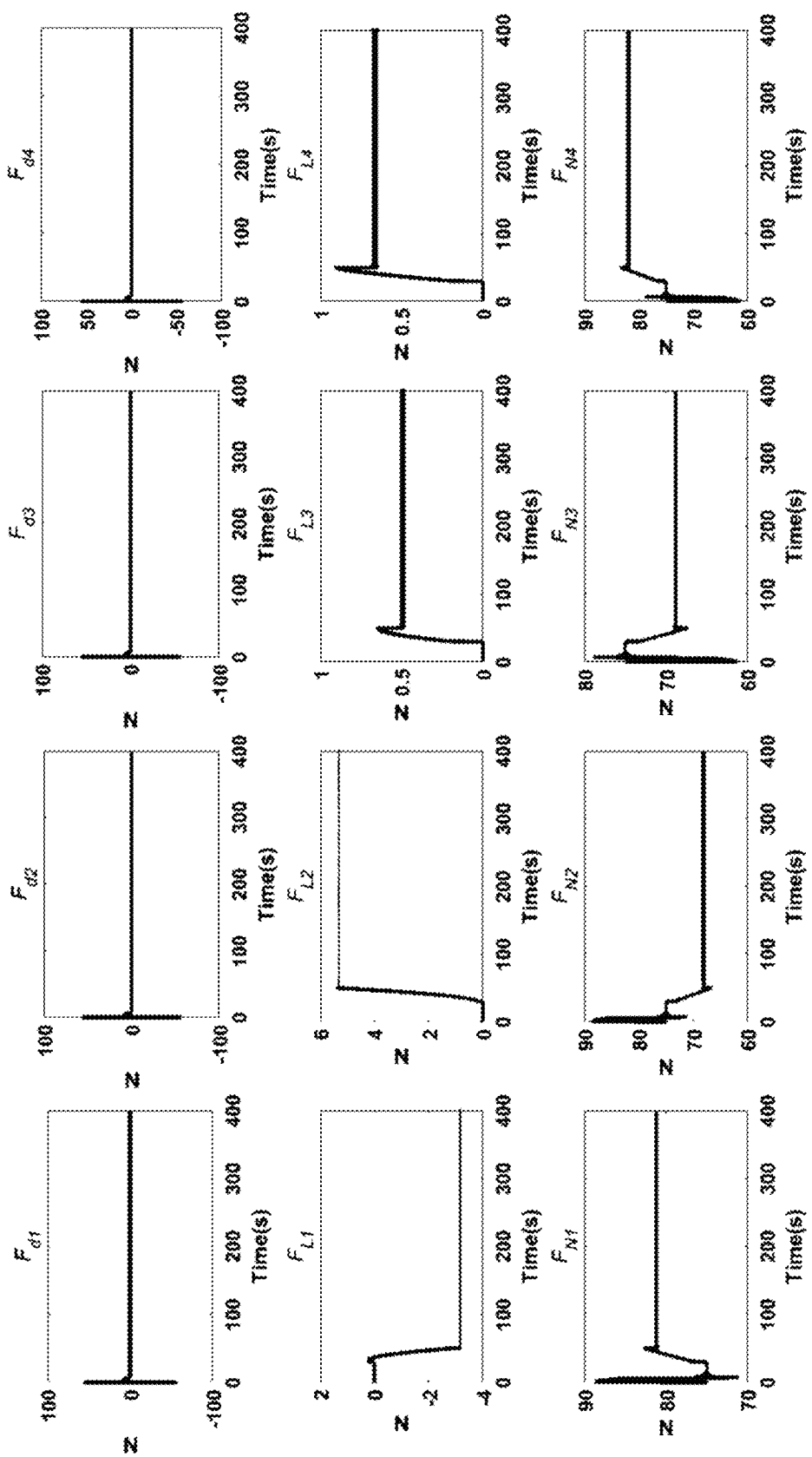
FIG. 17 shows intermediate variable curves during traveling on the ground only of the flying automobile in an embodiment of the present invention.

The simulation embodiment is used to verify the reliability of the coupled dynamic model of the flying automobile at the time of traveling on the ground. In this simulation embodiment, the rotor-type flying automobile accelerates gradually from a stationary state on the ground and performs steering. A simulation result of this embodiment is shown in FIGS. 11 to 17. FIG. 11 shows a plane mapping trajectory of the flying automobile during traveling on the ground only, FIG. 12 shows output variable curves during traveling on the ground only, FIG. 13 shows suspension displacement curves during traveling on the ground only, FIG. 14 shows flight dynamic parameter curves during traveling on the ground only, FIG. 15 shows rotational speeds of an aircraft propeller during traveling on the ground only, FIG. 16 shows vehicle input variable curves during traveling on the ground only, and FIG. 17 shows intermediate variable curves during traveling on the ground only.

According to FIGS. 11 to 17, it can be seen the simulation result is consistent with laws of vehicle traveling, and the coupled dynamic model of the flying automobile provided in the embodiment of the present invention can be used for motion state control of the flying automobile in the touchdown state.

(2) Embodiment of Only Flying in the Air

The simulation embodiment is used to verify the reliability of the coupled dynamic model of the flying automobile at the time of flying in the air. In this simulation embodiment, the rotor-type flying automobile accelerates gradually from a hovering state in the air and performs steering. A simulation result of this embodiment is shown in FIGS. 18 to 25.

Figure 18:
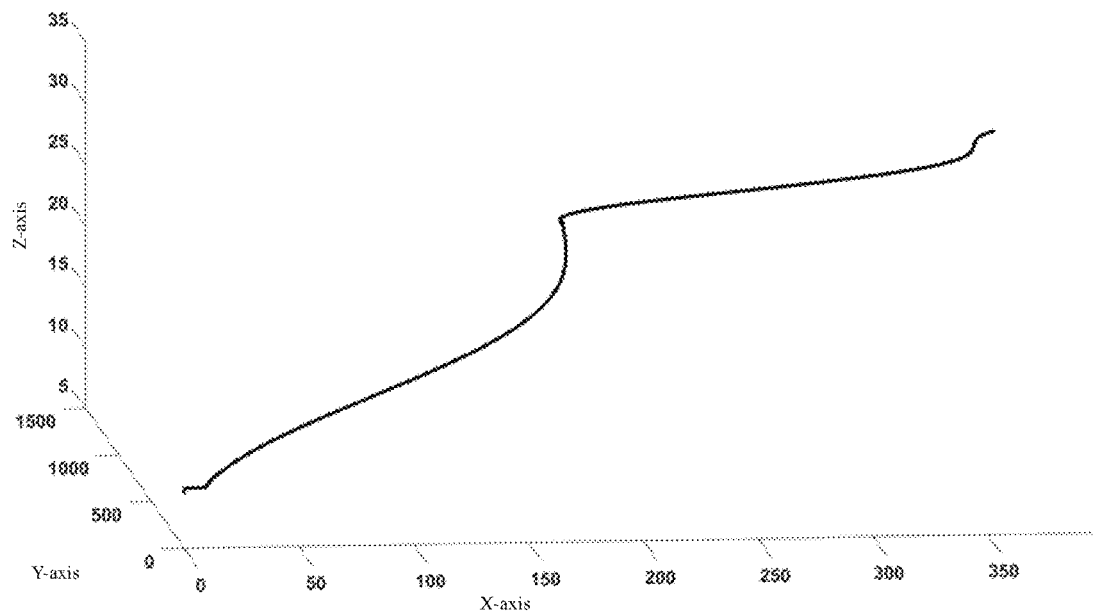
FIG. 18 shows a three-dimensional traveling trajectory of the flying automobile during flying in the air only of the flying automobile in an embodiment of the present invention.
Figure 19:
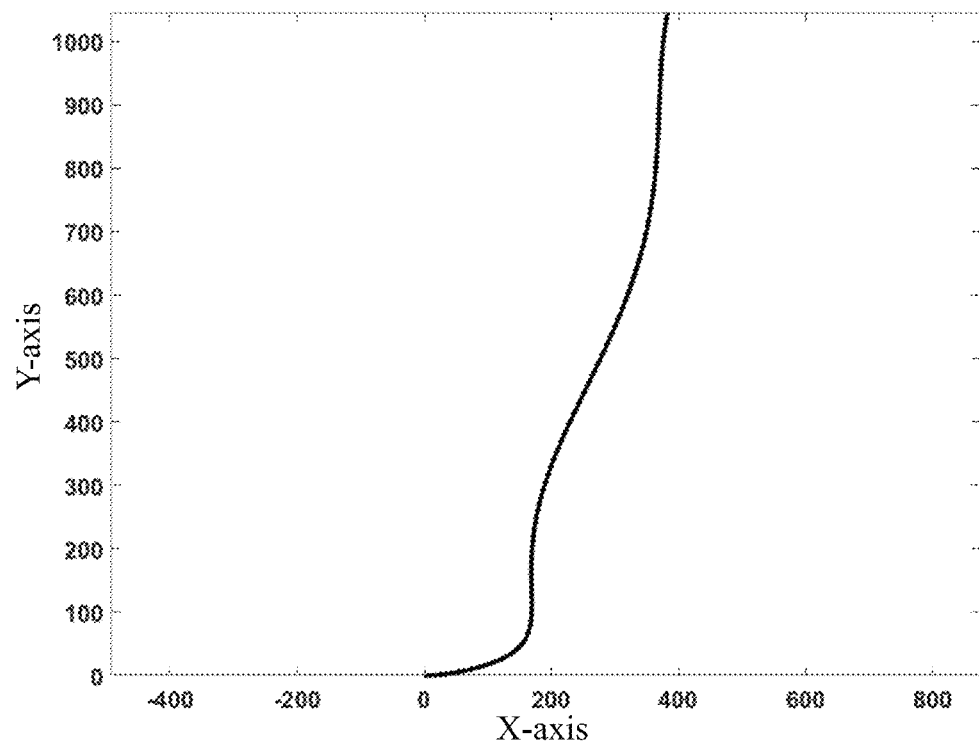
FIG. 19 shows a plane mapping trajectory of the flying automobile during flying in the air only of the flying automobile in an embodiment of the present invention.
Figure 20:
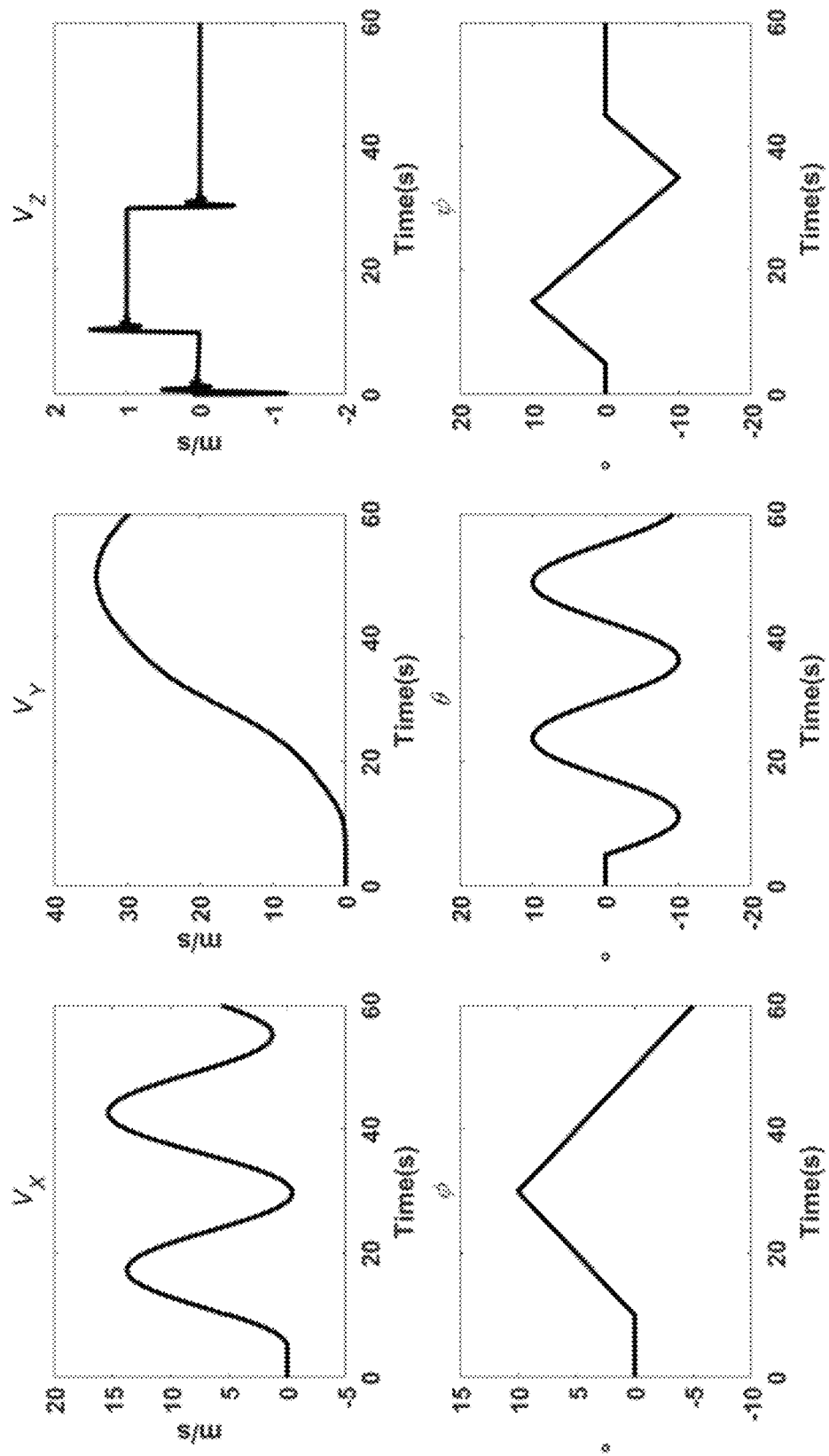
FIG. 20 shows output variable curves during flying in the air only of the flying automobile in an embodiment of the present invention.
Figure 21:
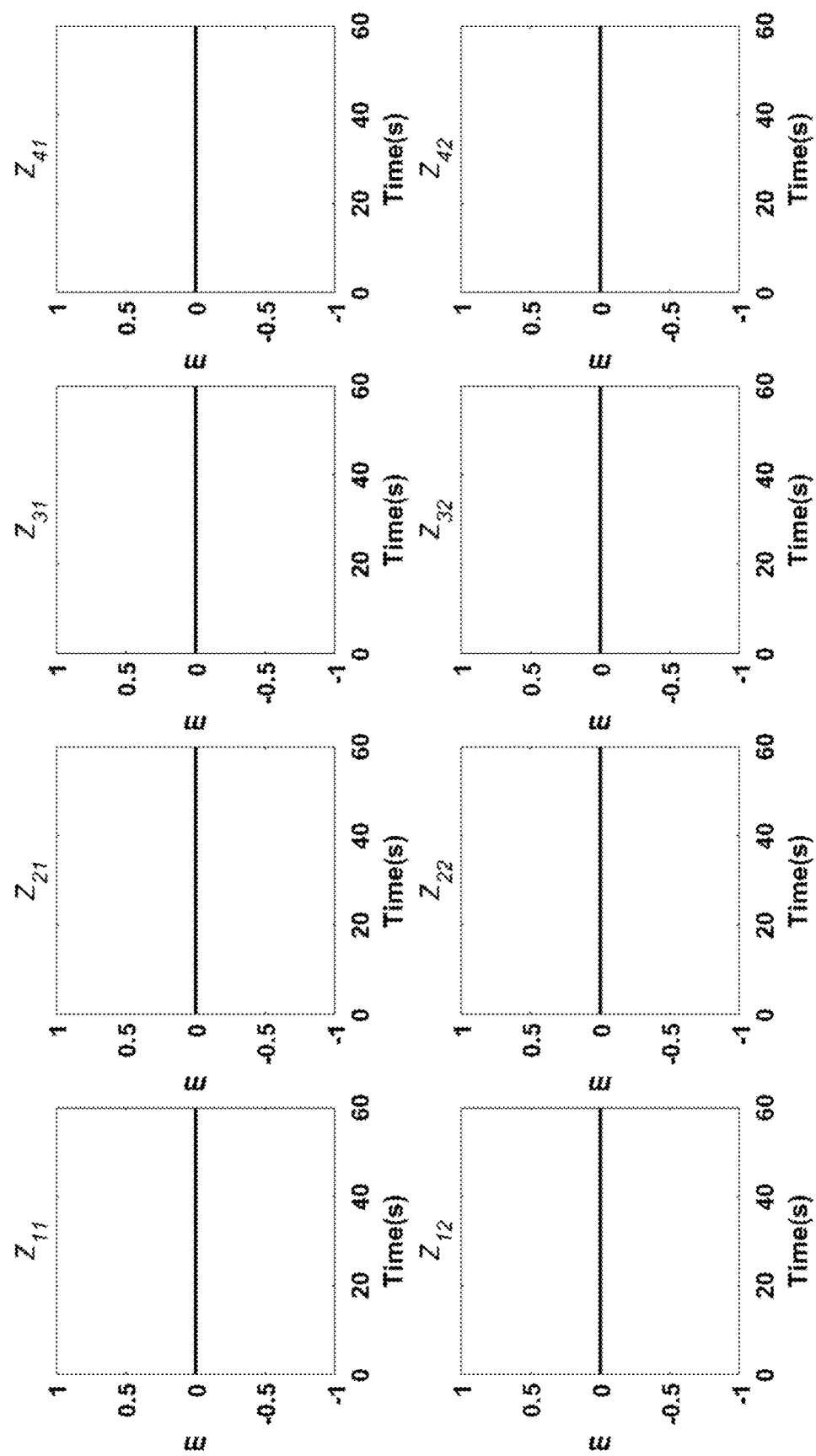
FIG. 21 shows suspension displacement curves during flying in the air only of the flying automobile in an embodiment of the present invention.
Figure 22:
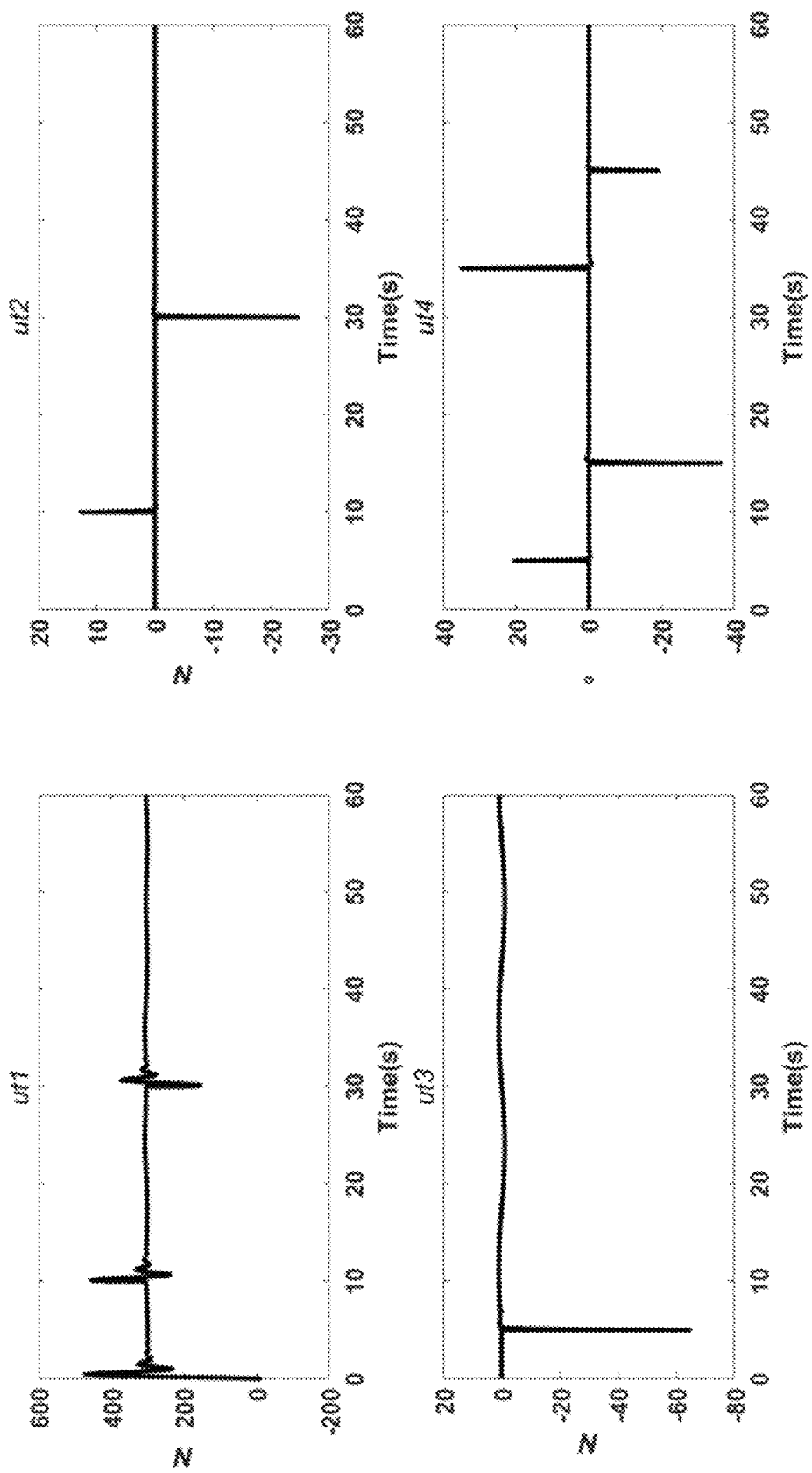
FIG. 22 shows input variable curves of the rotor part during flying in the air only of the flying automobile in an embodiment of the present invention.
Figure 23:
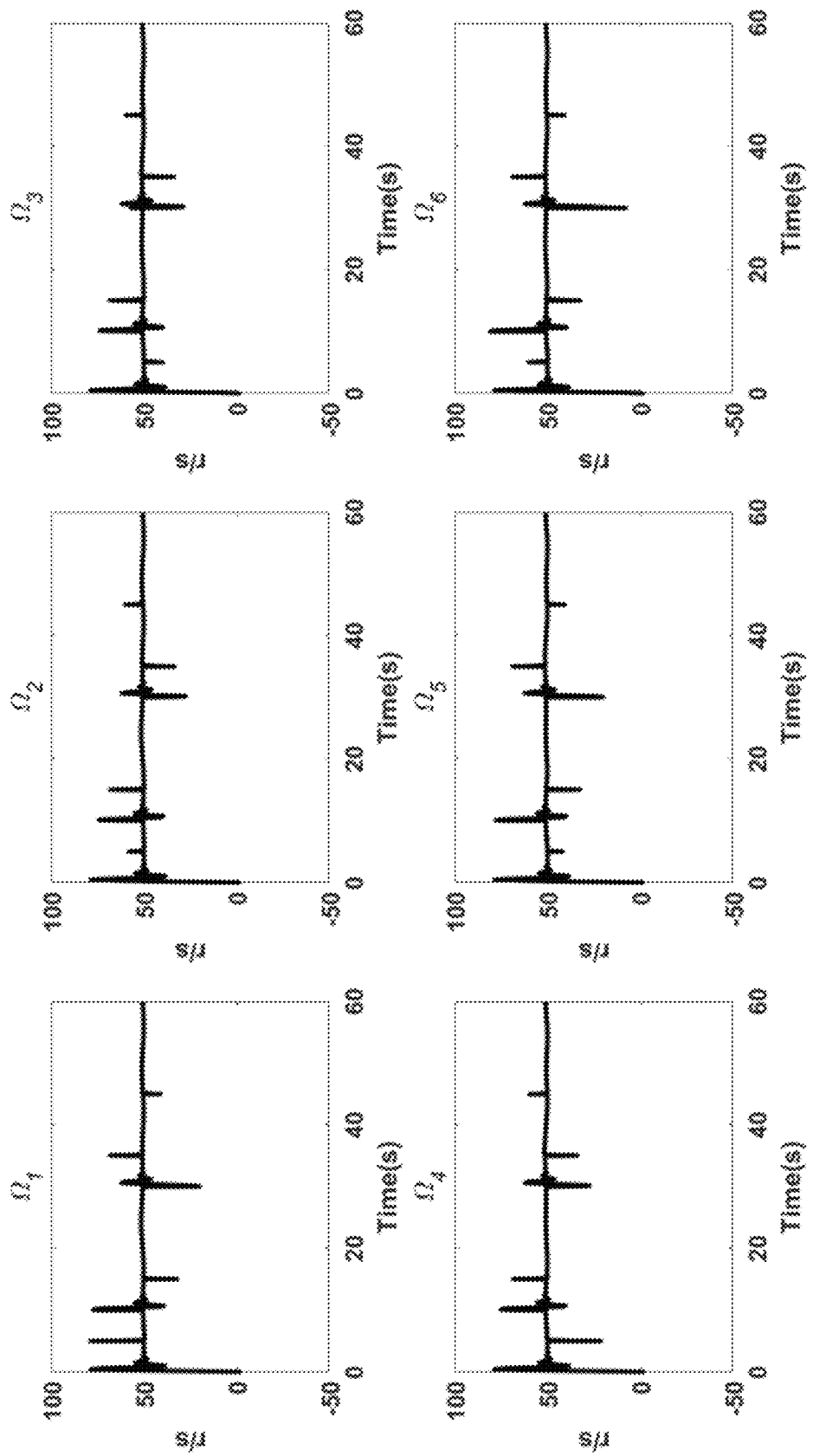
FIG. 23 shows rotational speeds of the propeller of the rotor part during flying in the air only of the flying automobile in an embodiment of the present invention.
Figure 24:
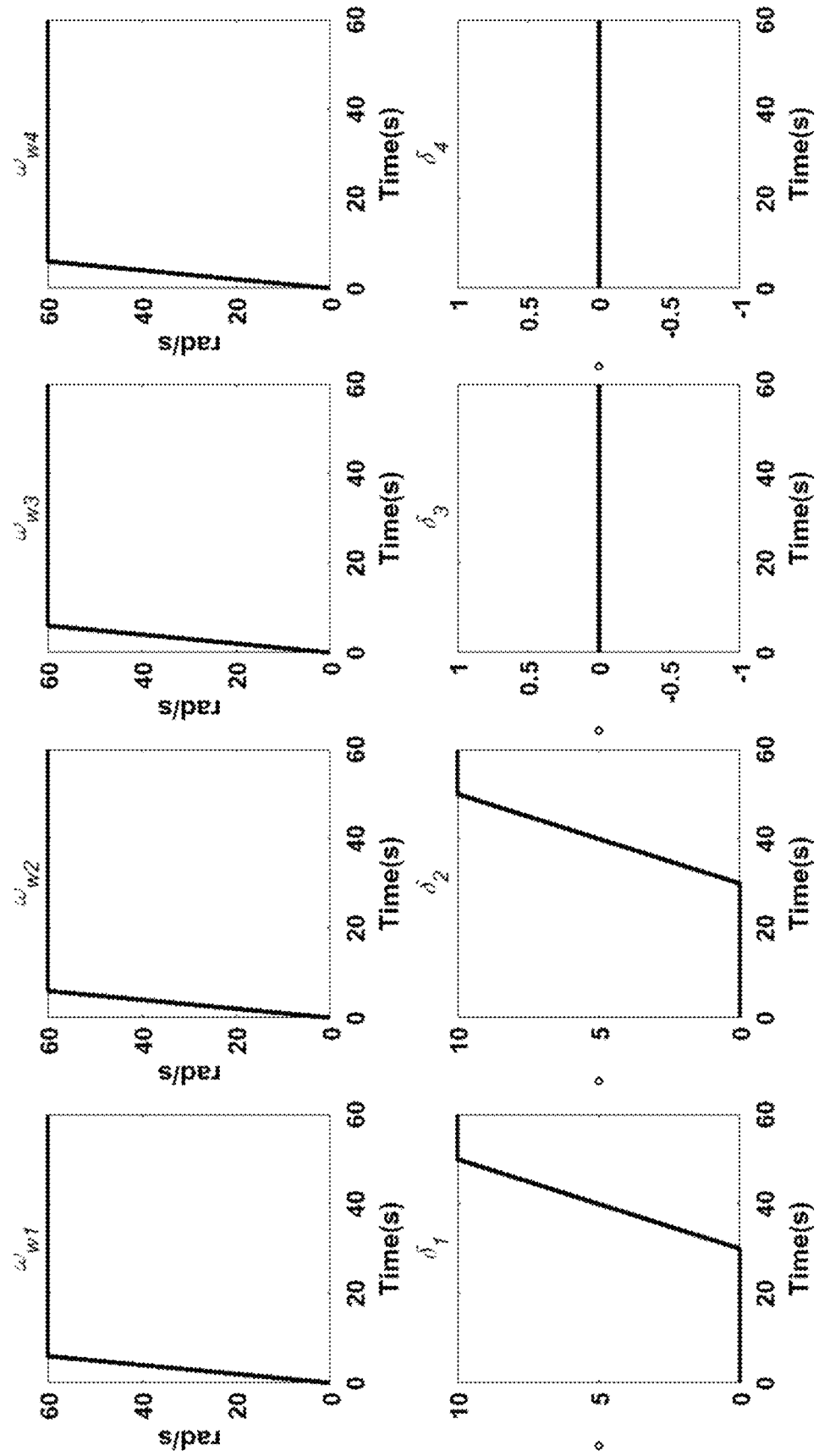
FIG. 24 shows input variable curves of the vehicle part during flying in the air only of the flying automobile in an embodiment of the present invention.
Figure 25:
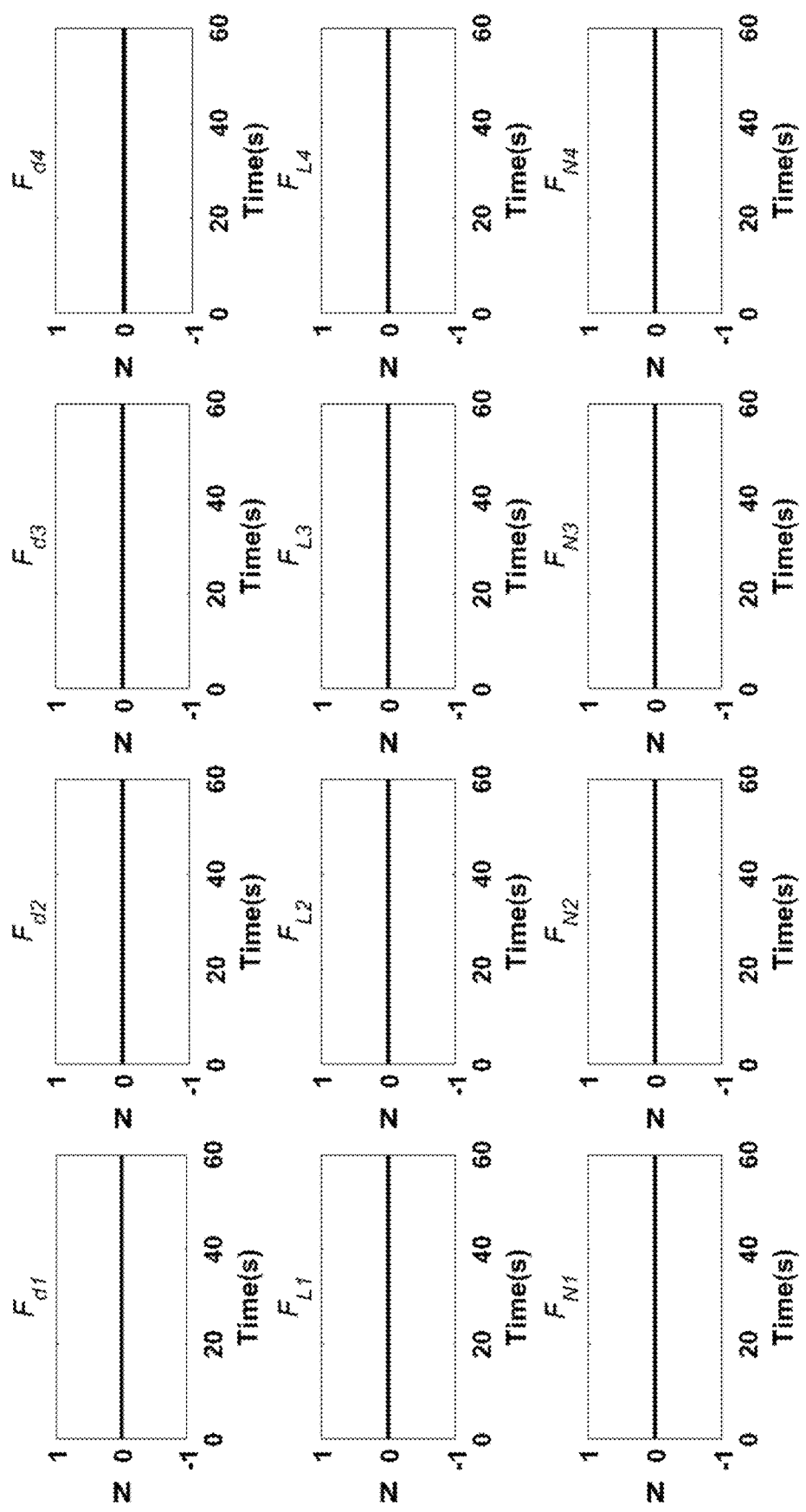
FIG. 25 shows intermediate variable curves during flying in the air only of the flying automobile in an embodiment of the present invention.

FIG. 18 shows a three-dimensional traveling trajectory of the flying automobile during flying in the air only, FIG. 19 shows a plane mapping trajectory of the flying automobile during flying in the air only, FIG. 20 shows output variable curves during flying in the air only, FIG. 21 shows suspension displacement curves during flying in the air only, FIG. 22 shows input variable curves of the rotor part during flying in the air only, FIG. 23 shows rotational speeds of the propeller of the rotor part during flying in the air only, FIG. 24 shows input variable curves of the vehicle part during flying in the air only, and FIG. 25 shows intermediate variable curves during flying in the air only.

According to FIGS. 18 to 25, it can be seen the simulation result is consistent with laws of motion of a six-rotor aircraft, and the coupled dynamic model of the flying automobile provided in the embodiment of the present invention can be used for motion state control of the flying automobile in the flying state.

(3) Embodiment of Two-Wheel Touchdown After Takeoff

The simulation embodiment is used to verify the reliability of the coupled dynamic model of the flying automobile at the time of takeoff and landing. In this simulation embodiment, the rotor-type flying automobile accelerates gradually from a stationary state on the ground, and then takes off by a lift provided gradually by the rotor part, and during landing, it undergoes changes in an undulation angle θ due to attitude adjustment, and finally touches the ground with two wheels. A simulation result of this embodiment is shown in FIGS. 26 to 34.

Figure 26:
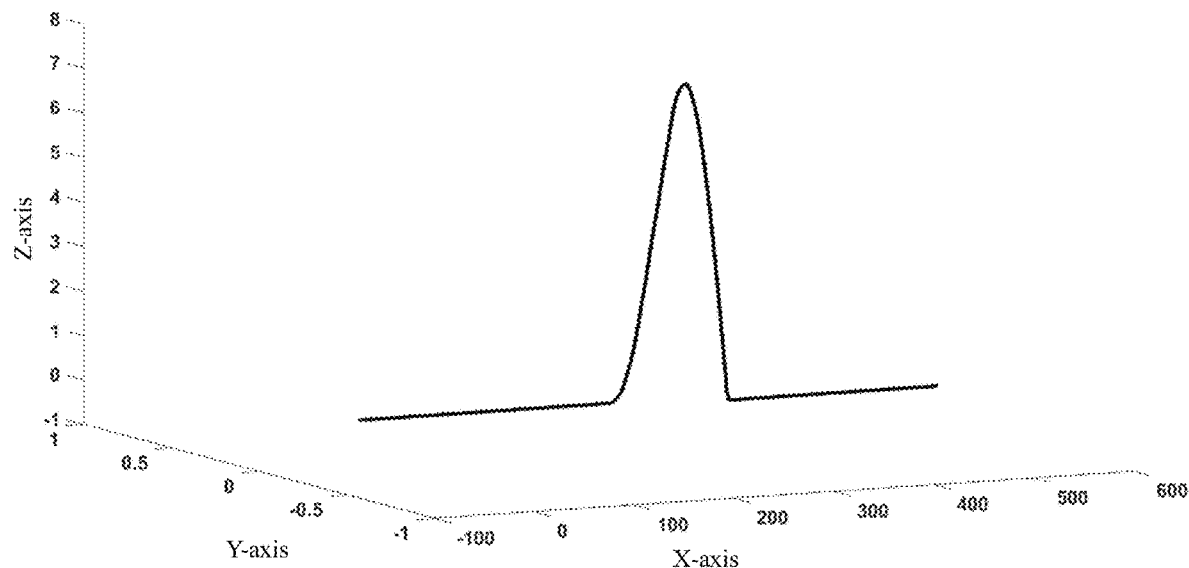
FIG. 26 shows a three-dimensional traveling trajectory of the flying automobile during two-wheel touchdown after takeoff of the flying automobile in an embodiment of the present invention.
Figure 27:
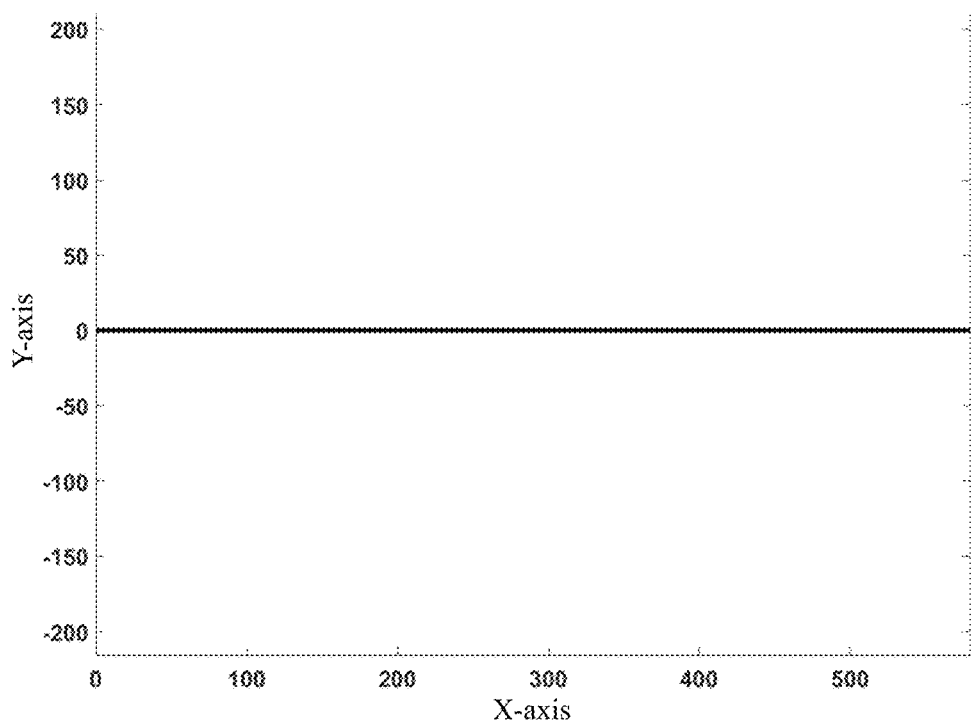
FIG. 27 shows a plane mapping trajectory of the flying automobile during two-wheel touchdown after takeoff of the flying automobile in an embodiment of the present invention.
Figure 28:
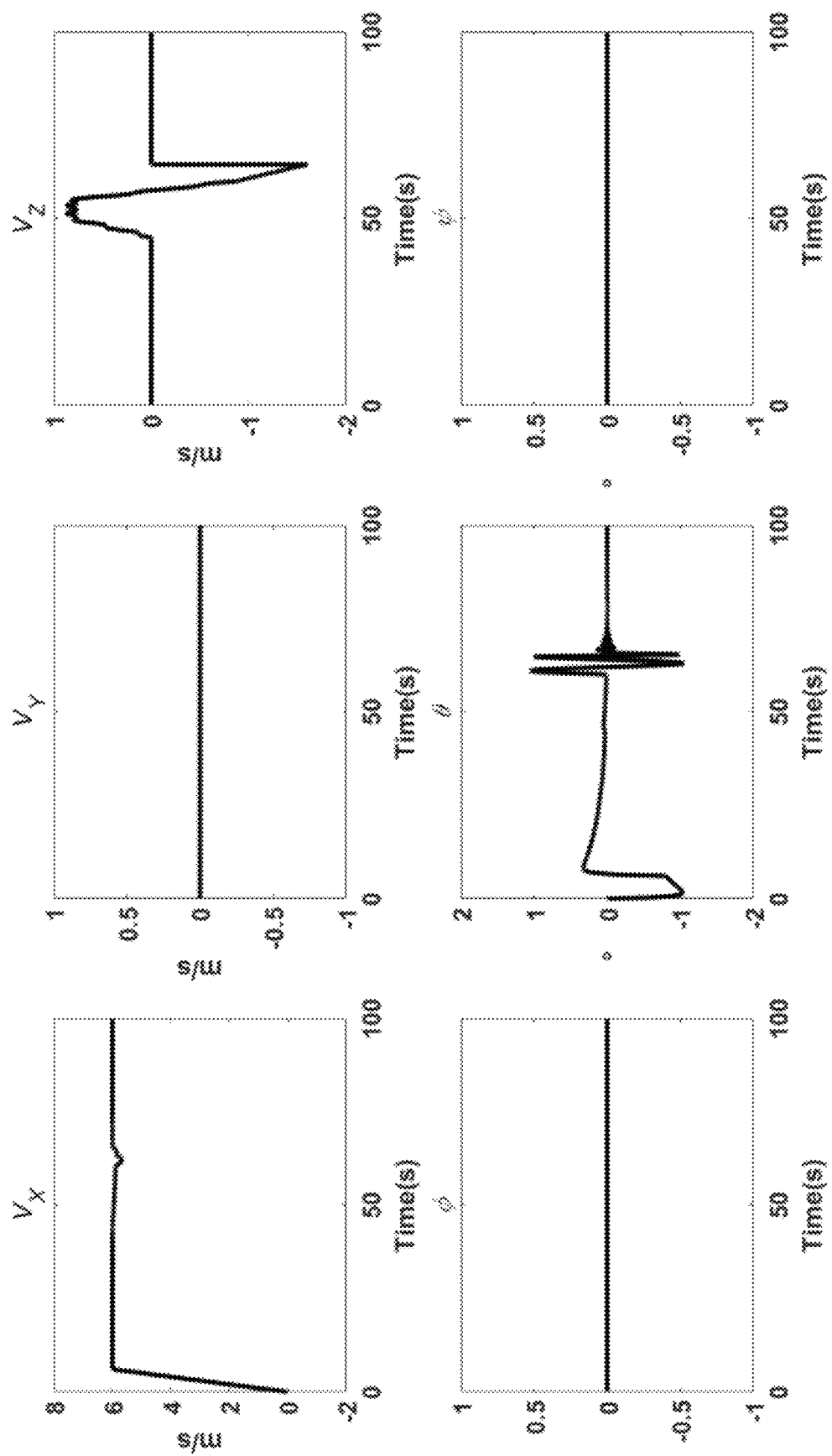
FIG. 28 shows output variable curves during two-wheel touchdown after takeoff of the flying automobile in an embodiment of the present invention.
Figure 29:
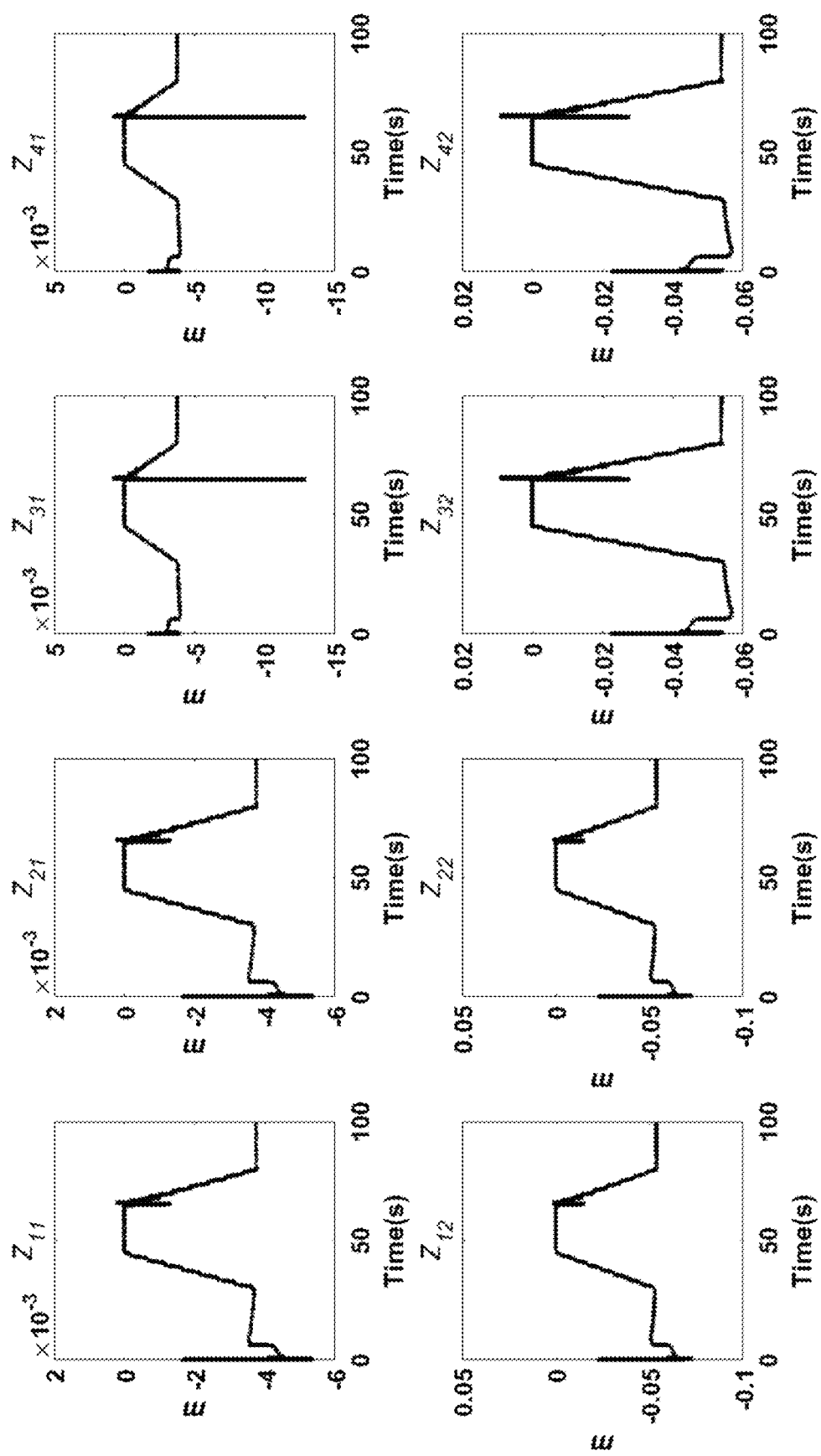
FIG. 29 shows suspension displacement curves during two-wheel touchdown after takeoff of the flying automobile in an embodiment of the present invention.
Figure 30:
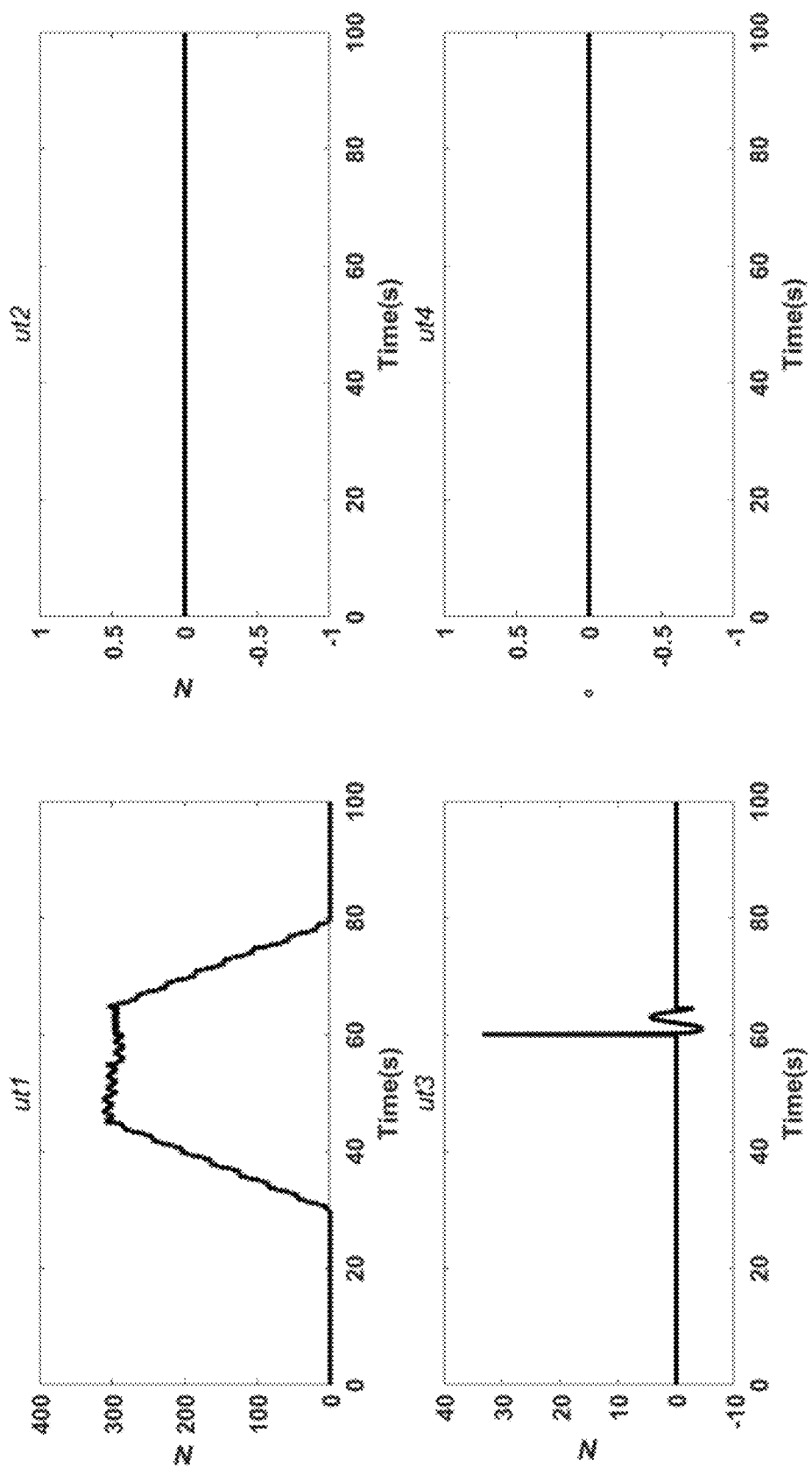
FIG. 30 shows input variable curves of the rotor part during two-wheel touchdown after takeoff of the flying automobile in an embodiment of the present invention.
Figure 31:
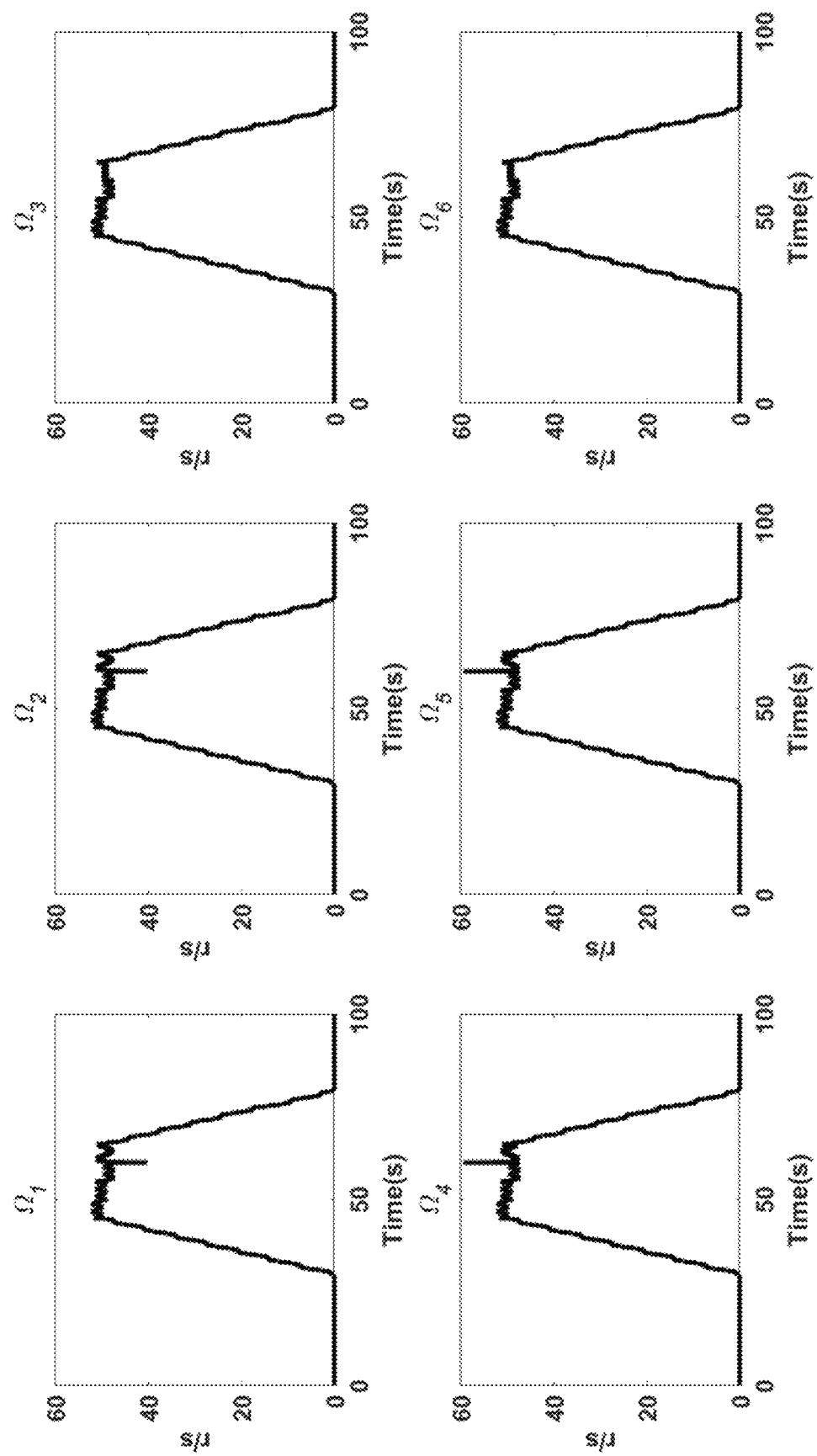
FIG. 31 shows rotational speeds of the propeller of the rotor part during two-wheel touchdown after takeoff of the flying automobile in an embodiment of the present invention.
Figure 32:
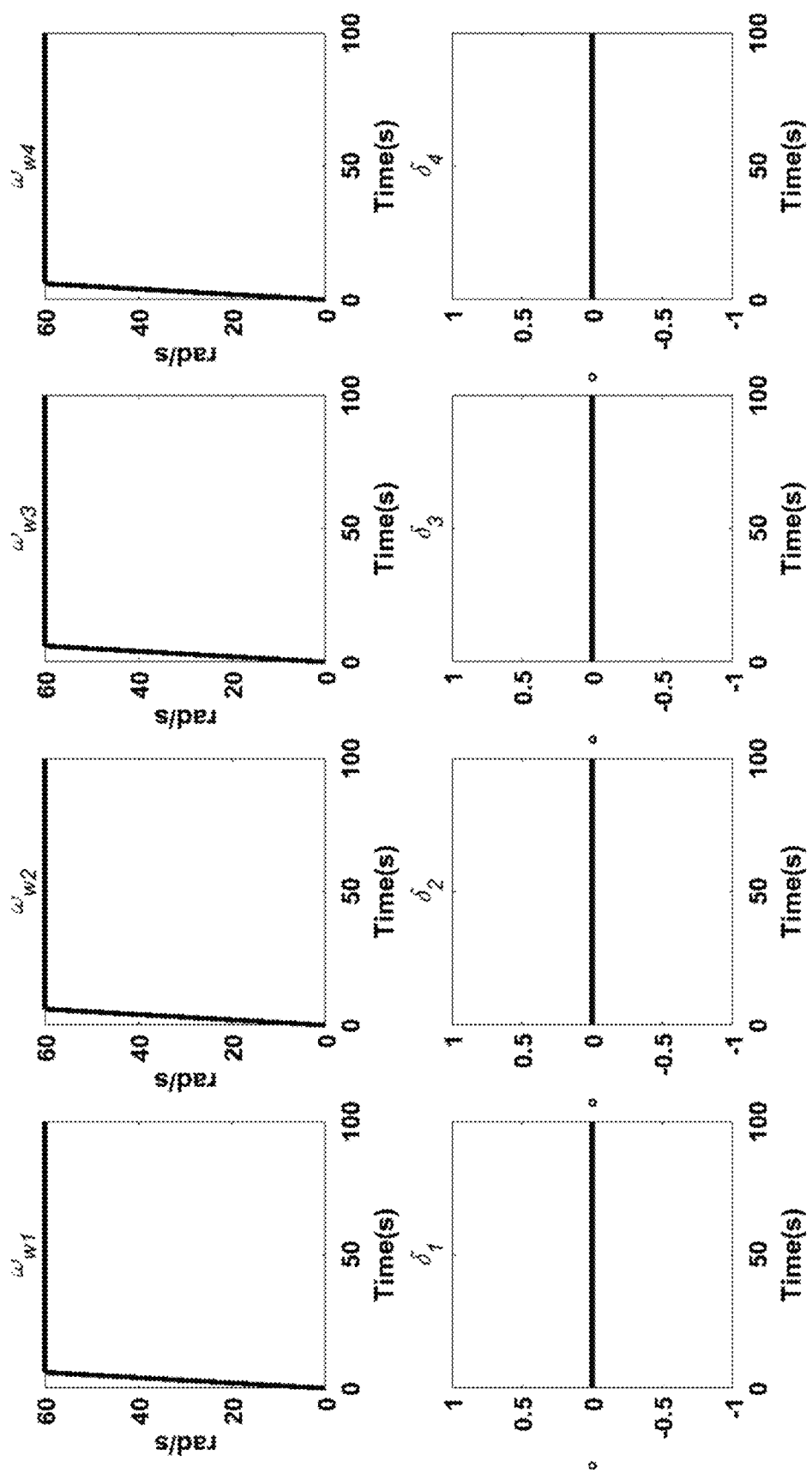
FIG. 32 shows input variable curves of the vehicle part during two-wheel touchdown after takeoff of the flying automobile in an embodiment of the present invention.
Figure 33:
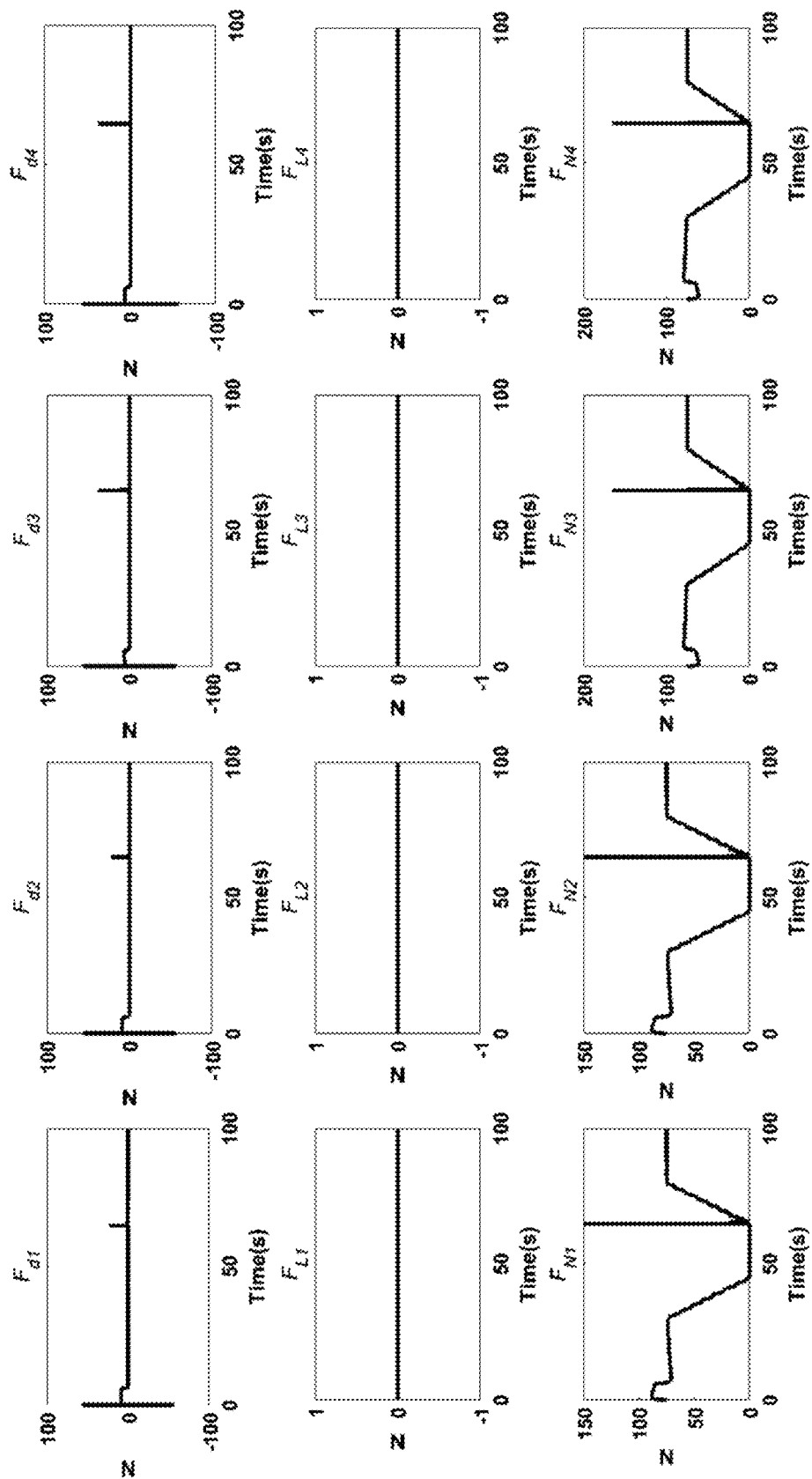
FIG. 33 shows intermediate variable curves during two-wheel touchdown after takeoff of the flying automobile in an embodiment of the present invention.
Figure 34:
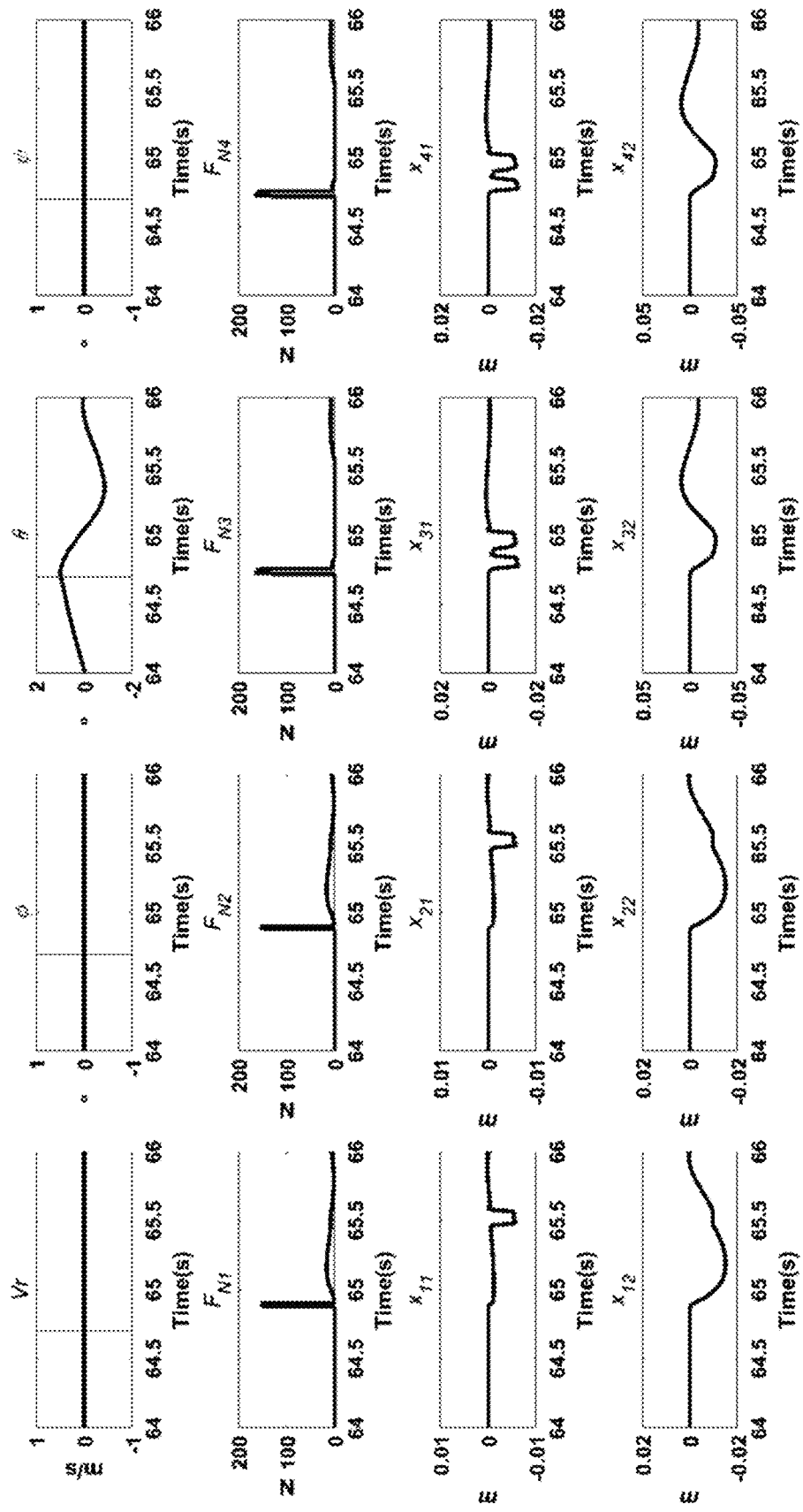
FIG. 34 illustrates changes in parameters at the moment of collision during two-wheel touchdown after takeoff of the flying automobile in an embodiment of the present invention.

FIG. 26 shows a three-dimensional traveling trajectory of the flying automobile during two-wheel touchdown after takeoff, FIG. 27 shows a plane mapping trajectory of the flying automobile during two-wheel touchdown after takeoff, FIG. 28 shows output variable curves during two-wheel touchdown after takeoff, FIG. 29 shows suspension displacement curves during two-wheel touchdown after takeoff, FIG. 30 shows input variable curves of the rotor part during two-wheel touchdown after takeoff, FIG. 31 shows rotational speeds of the propeller of the rotor part during two-wheel touchdown after takeoff, FIG. 32 shows input variable curves of the vehicle part during two-wheel touchdown after takeoff, and FIG. 33 shows intermediate variable curves during two-wheel touchdown after takeoff. To describe in more detail a change in state of the flying automobile during the collision, FIG. 34 illustrates changes in parameters at the moment of collision during two-wheel touchdown after takeoff.

As can be seen from the above description, in this embodiment, when the vehicle lands, it undergoes changes in the undulation angle θ due to attitude adjustment, and the front and rear tires of the vehicle do not touch the ground at the same time due to the presence of the angle θ, and as the angle θ is positive during landing, a pair of rear wheels touch the ground before a pair of front wheels, and then after touchdown, the suspension corresponding to the front and rear wheels is subjected to impacts successively, and after all the four wheels touch the ground, the angle θ gradually returns to 0 in continuous vibrations of the suspension.

According to FIGS. 26 to 34, it can be seen the coupled dynamic model of the flying automobile of the embodiment of the present invention can well simulate the motion of the flying automobile during takeoff and landing, and can be used for motion state control of the flying automobile in the takeoff/landing state.

(4) Embodiment of Single-Wheel Touchdown After Takeoff

The simulation embodiment is used to verify the reliability of the coupled dynamic model of the flying automobile at the time of takeoff and landing. In this simulation embodiment, the rotor-type flying automobile accelerates gradually from a stationary state on the ground, and then takes off by a lift provided gradually by the rotor part, and during landing, it undergoes changes in an undulation angle θ due to attitude adjustment, and finally touches the ground. Due to crosswind of 5 m/s during landing, the rotor-type flying automobile has a relatively large lateral velocity, and if it lands at this velocity, the vehicle is liable to roll over laterally. Therefore, the rotor-type flying automobile needs to adjust a roll angle θ to offset a lateral velocity change caused by the crosswind, but adjusting the angle φ will cause the rotor-type flying automobile to touch the ground with a single wheel during landing. A simulation result of this embodiment is shown in FIGS. 35 to 43.

Figure 35:
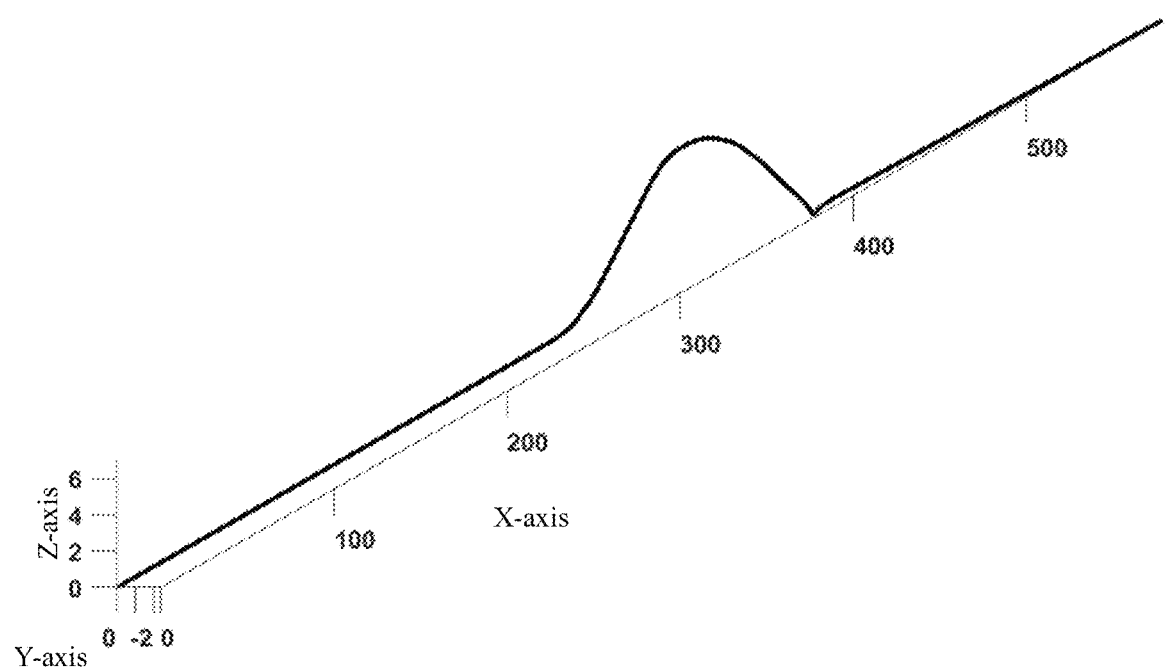
FIG. 35 shows a three-dimensional traveling trajectory of the flying automobile during single-wheel touchdown after takeoff of the flying automobile in an embodiment of the present invention.
Figure 36:
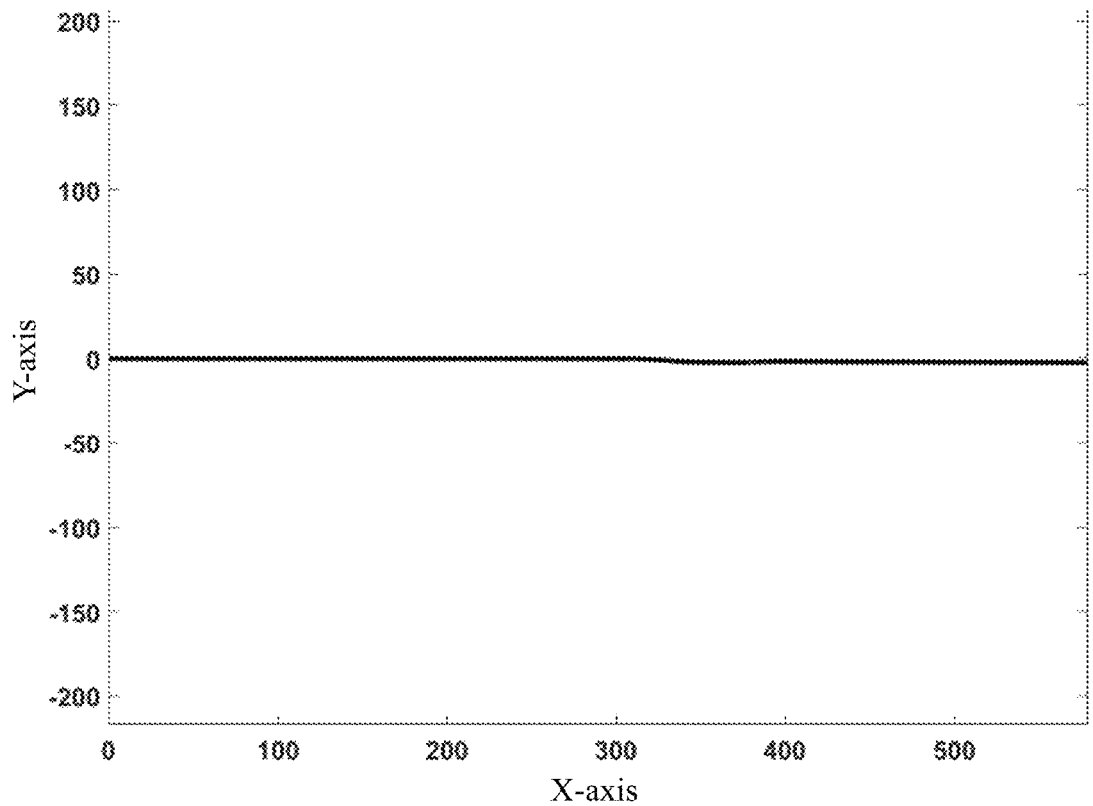
FIG. 36 shows a plane mapping trajectory of the flying automobile during single-wheel touchdown after takeoff of the flying automobile in an embodiment of the present invention.
Figure 37:
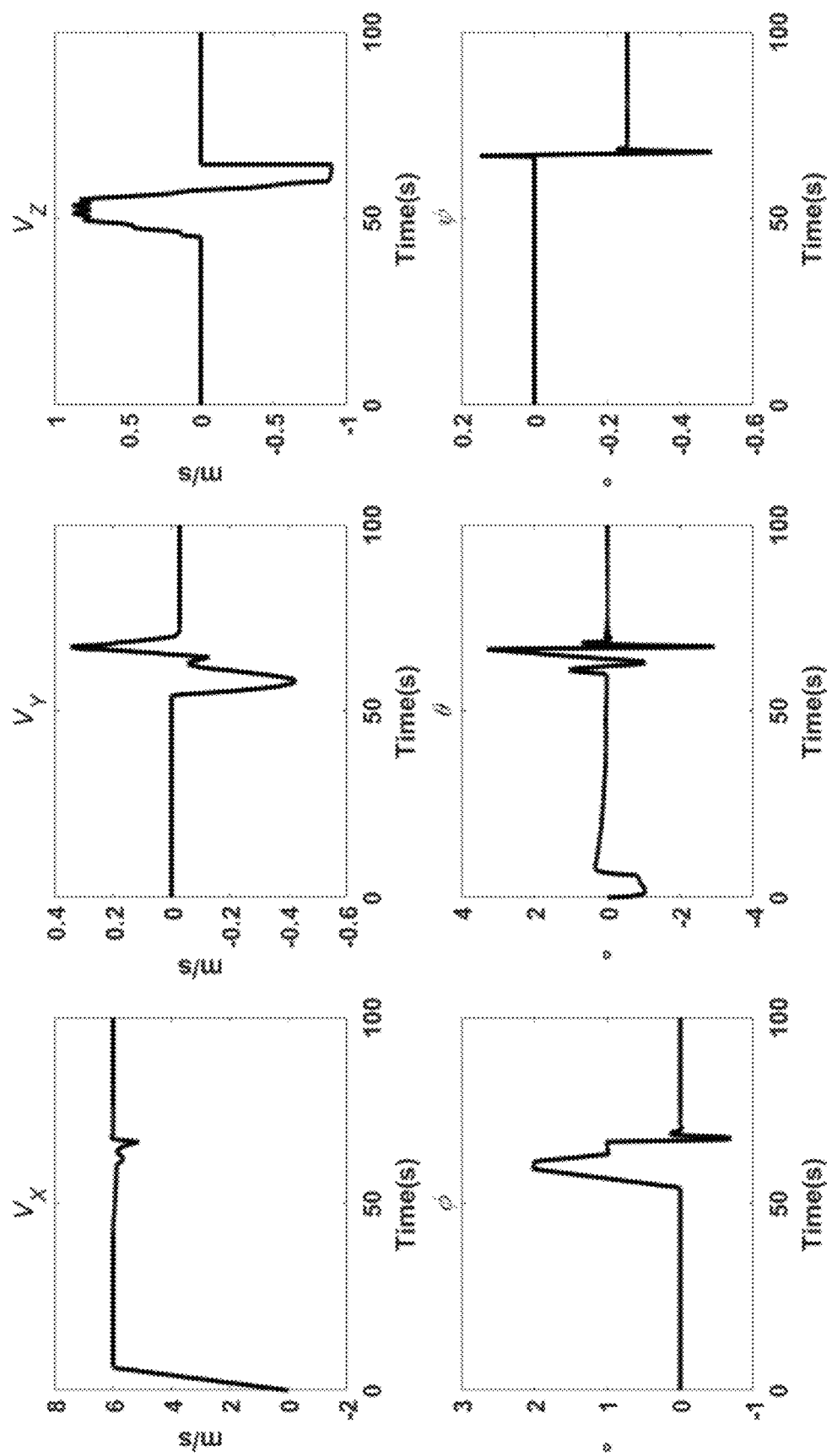
FIG. 37 shows output variable curves during single-wheel touchdown after takeoff of the flying automobile in an embodiment of the present invention.
Figure 38:
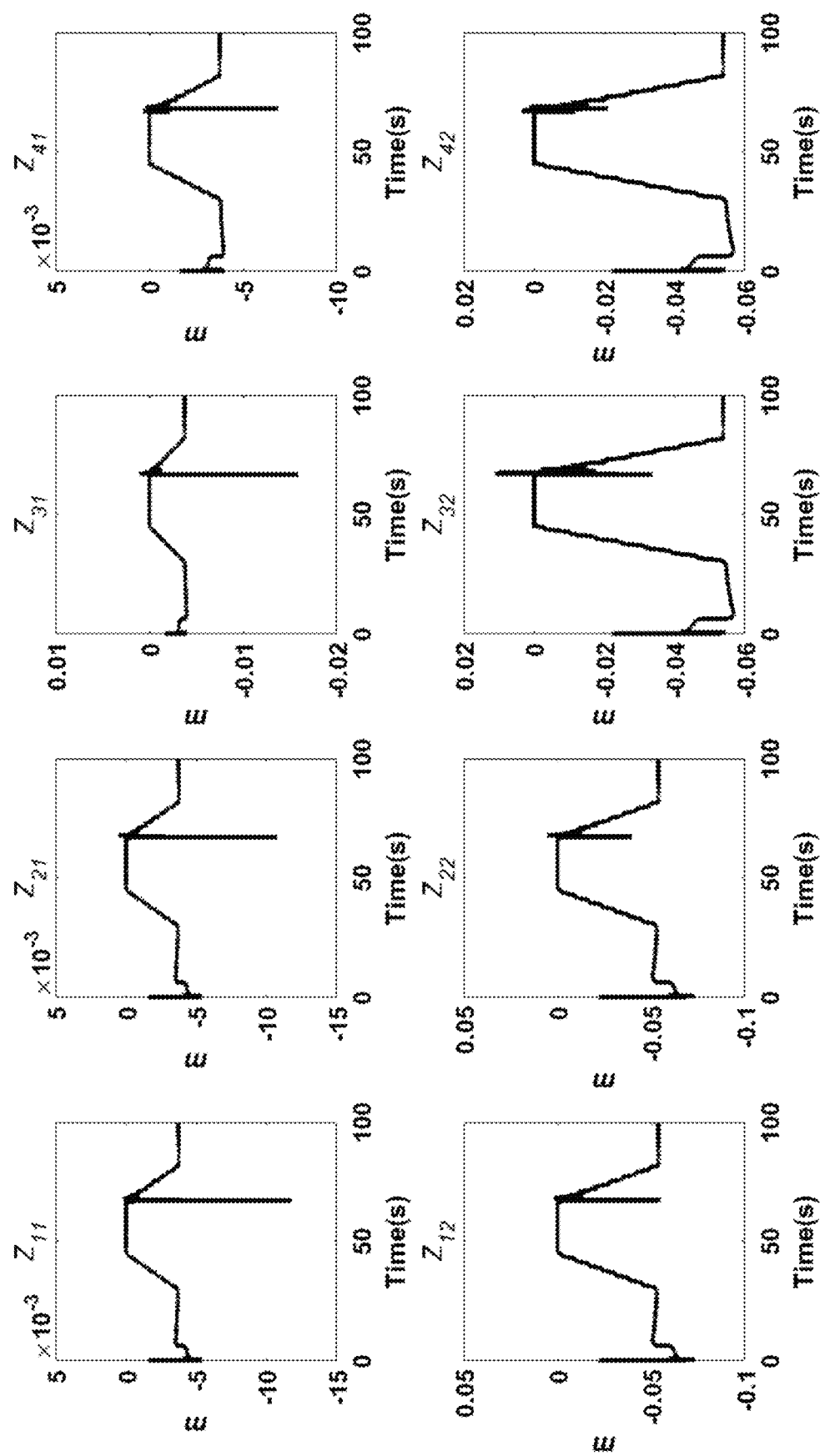
FIG. 38 shows suspension displacement curves during single-wheel touchdown after takeoff of the flying automobile in an embodiment of the present invention.
Figure 39:
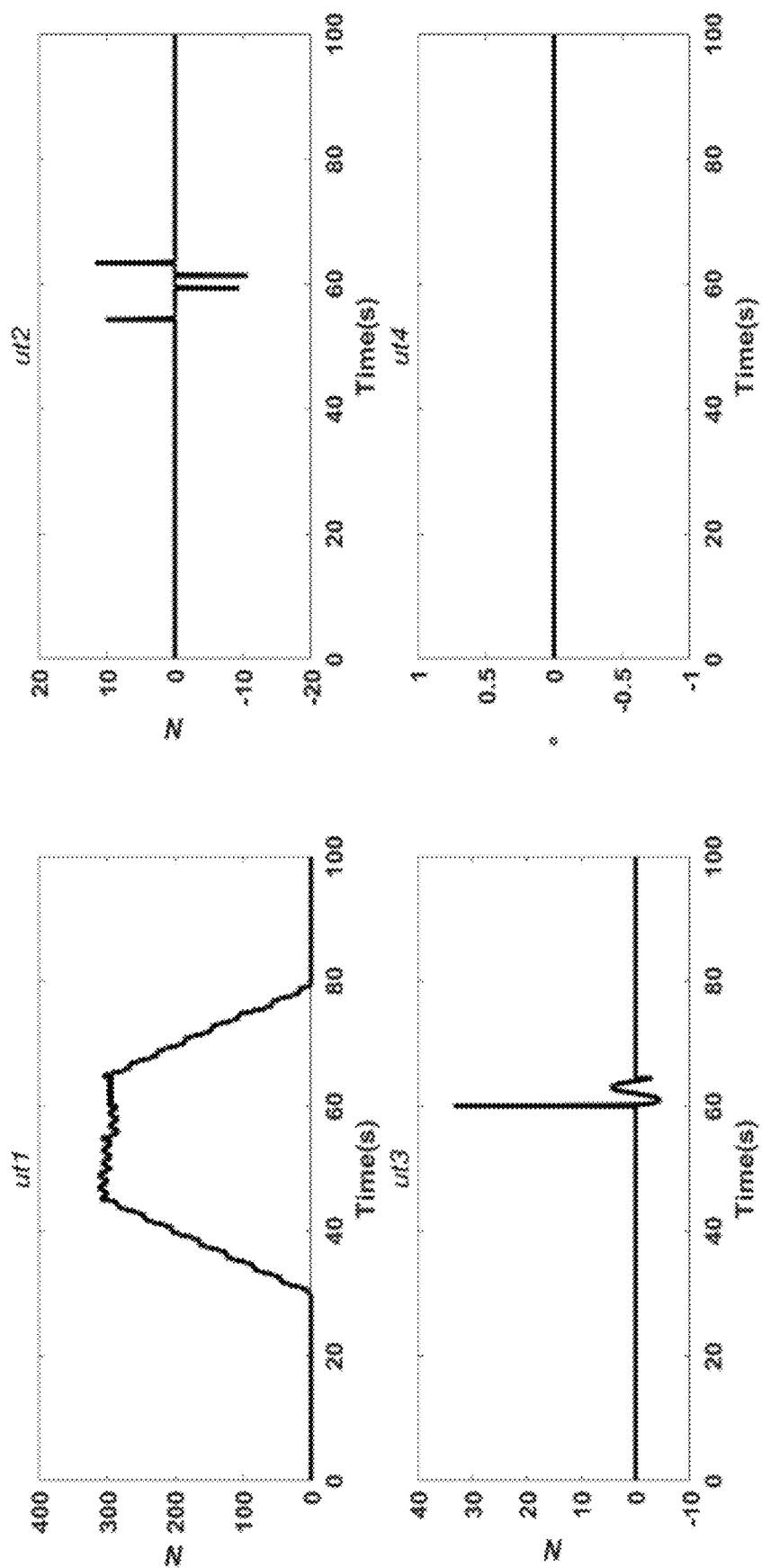
FIG. 39 shows input variable curves of the rotor part during single-wheel touchdown after takeoff of the flying automobile in an embodiment of the present invention.
Figure 40:
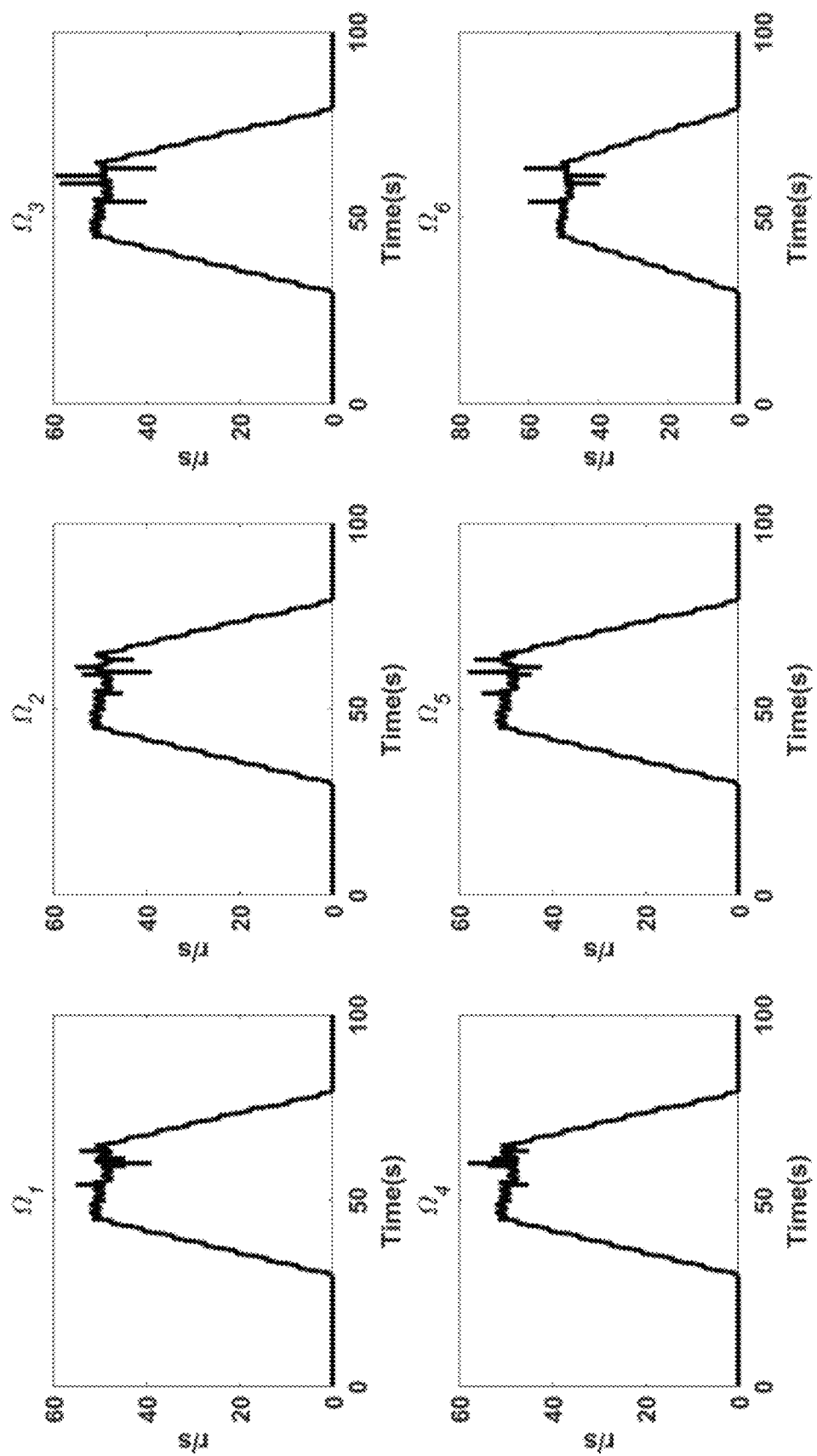
FIG. 40 shows rotational speeds of the propeller of the rotor part during single-wheel touchdown after takeoff of the flying automobile in an embodiment of the present invention.
Figure 41:
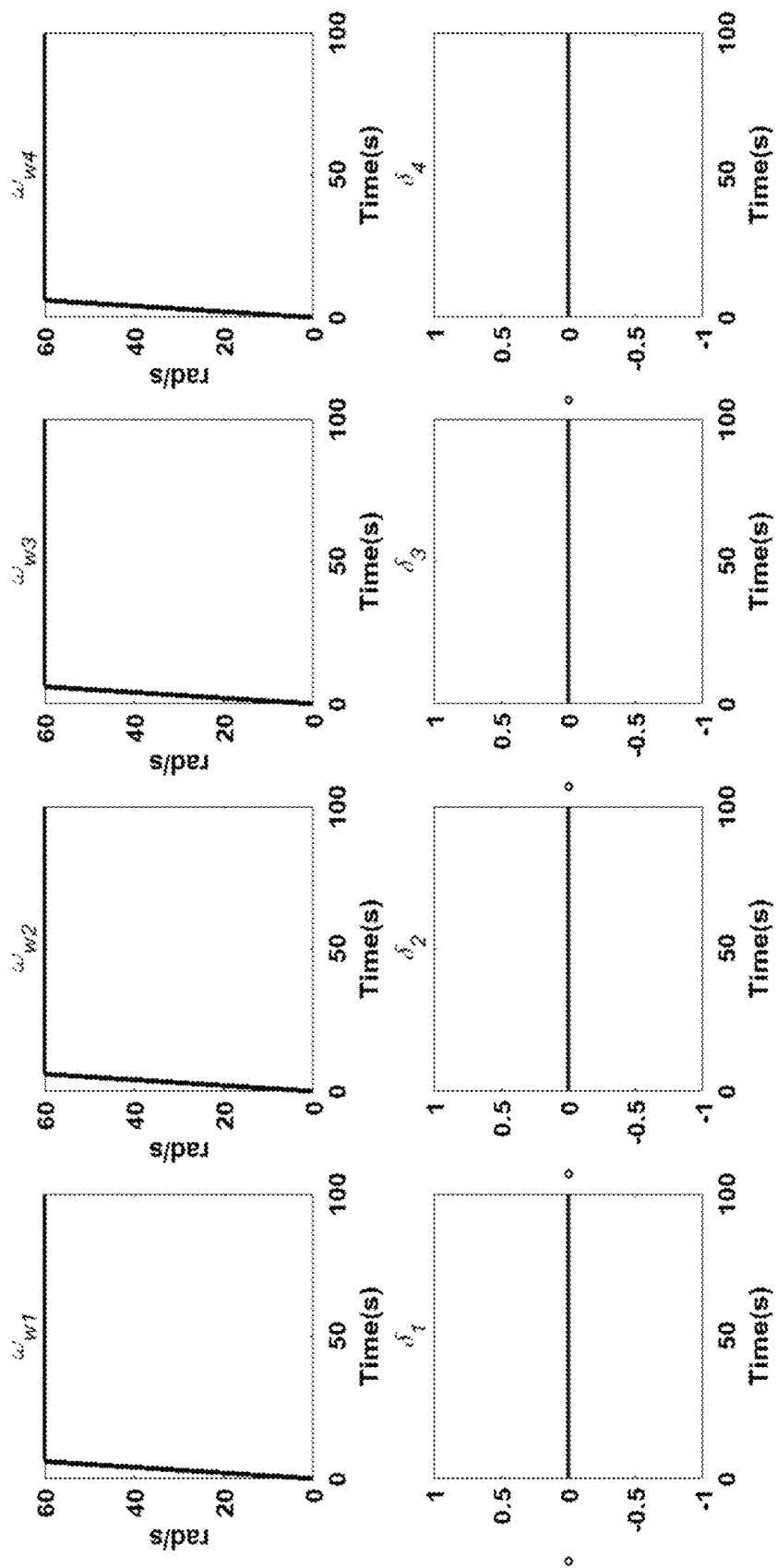
FIG. 41 shows input variable curves of the vehicle part during single-wheel touchdown after takeoff of the flying automobile in an embodiment of the present invention.
Figure 42:
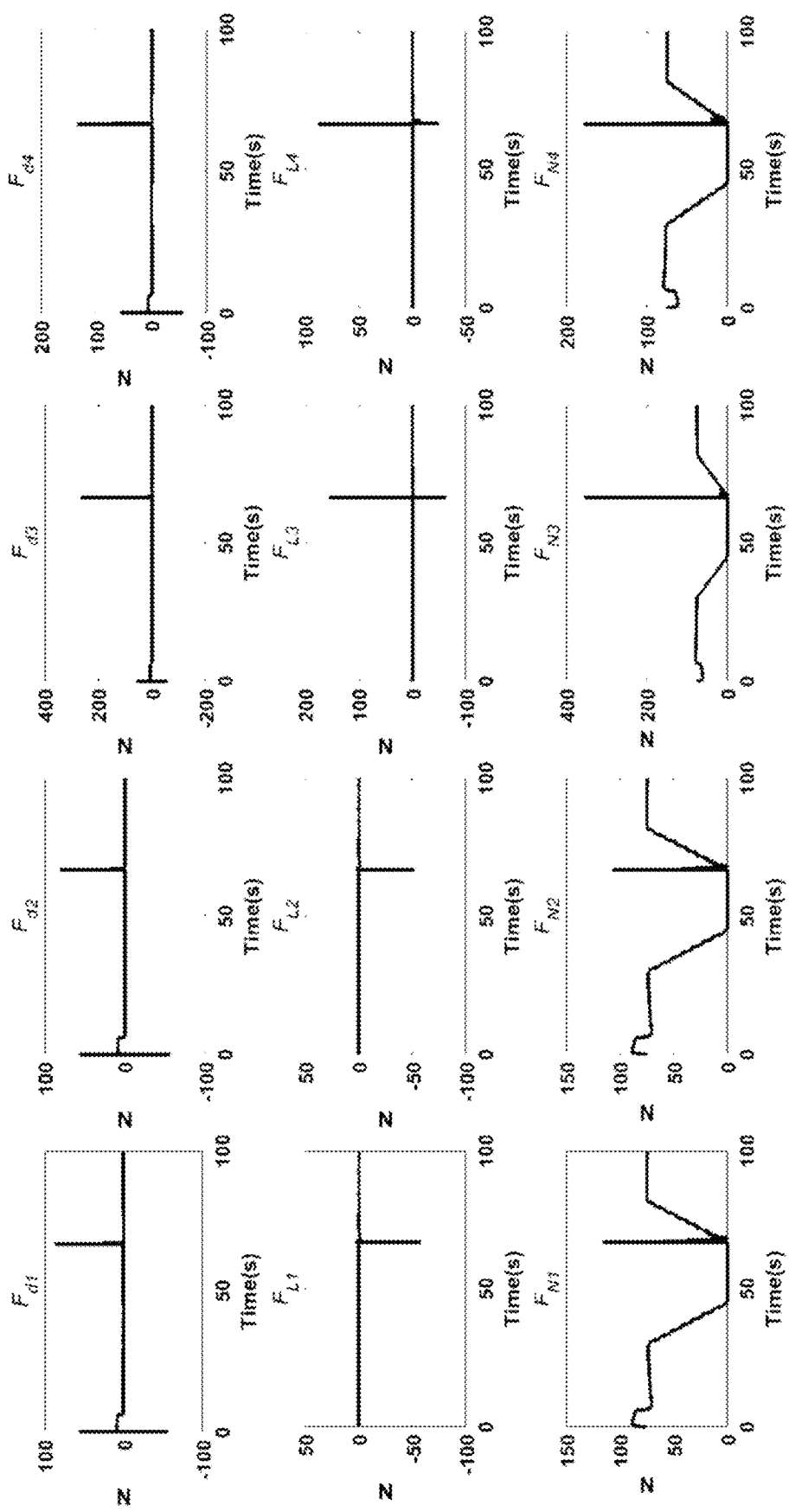
FIG. 42 shows intermediate variable curves during single-wheel touchdown after takeoff of the flying automobile in an embodiment of the present invention.
Figure 43:
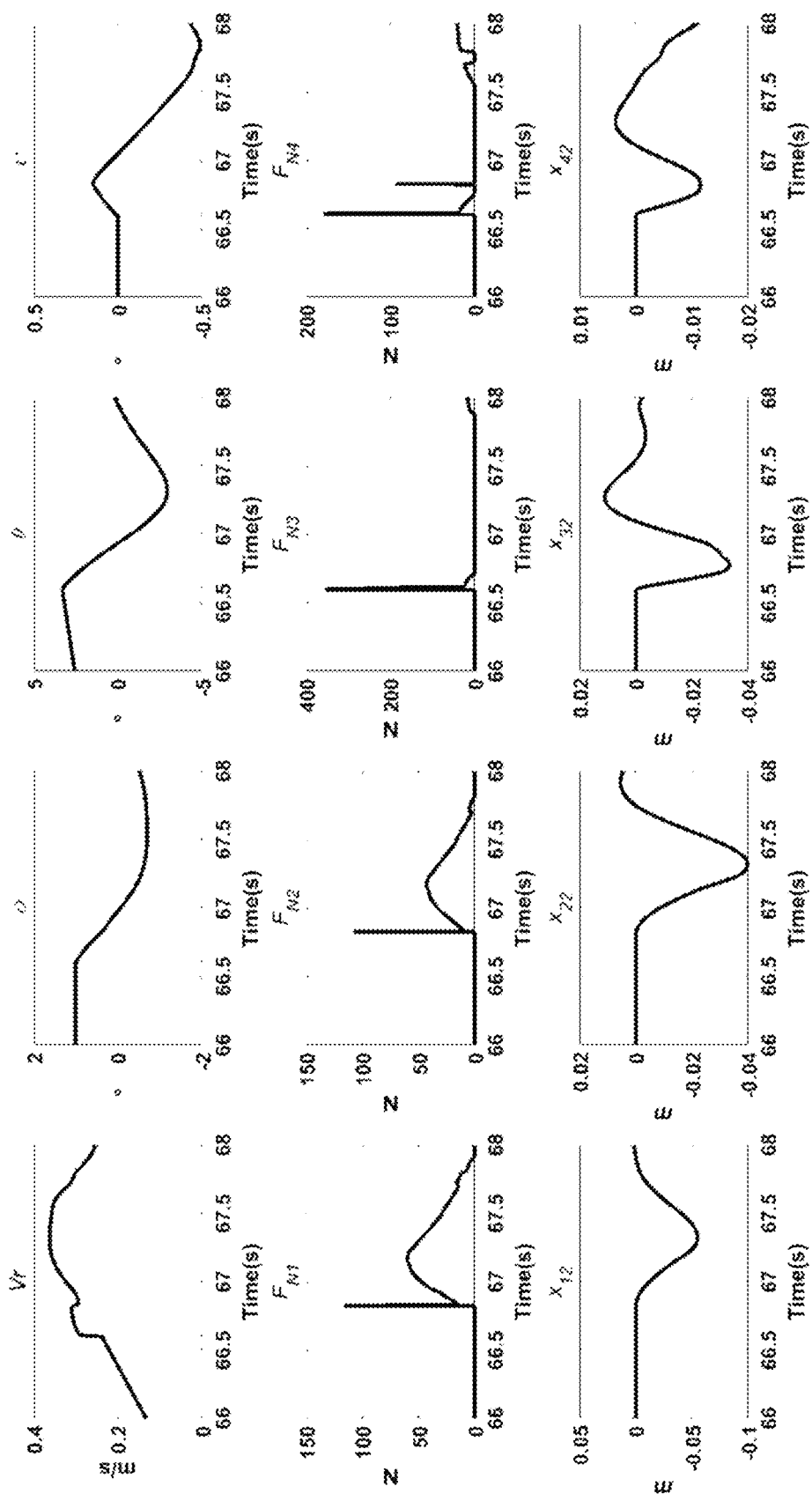
FIG. 43 illustrates changes in parameters at the moment of collision during single-wheel touchdown after takeoff of the flying automobile in an embodiment of the present invention.

FIG. 35 shows a three-dimensional traveling trajectory of the flying automobile during single-wheel touchdown after takeoff, FIG. 36 shows a plane mapping trajectory of the flying automobile during single-wheel touchdown after takeoff, FIG. 37 shows output variable curves during single-wheel touchdown after takeoff, FIG. 38 shows suspension displacement curves during single-wheel touchdown after takeoff, FIG. 39 shows input variable curves of the rotor part during single-wheel touchdown after takeoff, FIG. 40 shows rotational speeds of the propeller of the rotor part during single-wheel touchdown after takeoff, FIG. 41 shows input variable curves of the vehicle part during single-wheel touchdown after takeoff, and FIG. 42 shows intermediate variable curves during single-wheel touchdown after takeoff. To describe in more detail a change in state of the flying automobile during the collision, FIG. 43 illustrates changes in parameters at the moment of collision during single-wheel touchdown after takeoff.

As can be seen from the above description, in this embodiment, when the vehicle lands, it undergoes changes in the undulation angle θ due to attitude adjustment, and the front and rear tires of the vehicle do not touch the ground at the same time due to the presence of the angle θ, and it undergoes changes in the roll angle φ due to the large crosswind during landing. The left and right tires of the vehicle do not touch the ground at the same time due to the presence of the angle φ. Furthermore, as the angle θ and the angle φ are both positive during landing, none of the four wheels touches the ground at the same time, and it can be seen from FIG. 43 that a tire No. 3 touches the ground first. After touchdown, the suspension corresponding to the four wheels is subjected to impacts successively, and after all the four wheels touch the ground, the angle θ and the angle φ gradually return to 0 in continuous vibrations of the suspension.

According to FIGS. 35 to 43, it can be seen the coupled dynamic model of the flying automobile of the embodiment of the present invention can well simulate the motion of the flying automobile during takeoff and landing, and can be used for motion state control of the flying automobile in the takeoff/landing state.

An embodiment of the present invention also provides a takeoff and landing control apparatus of a flying automobile. The takeoff and landing control apparatus of a flying automobile includes a processor and a communication interface coupled to the processor, wherein processor is configured to run a computer program or instructions to execute the above-mentioned takeoff and landing control method of a flying automobile.

Compared with the prior art, the takeoff and landing control apparatus of a flying automobile provided in the embodiment of the present invention has the same beneficial effects as the takeoff and landing control method of a flying automobile described in the above technical solution, which will not be repeated here.

An embodiment of the present invention also provides a computer storage medium. The computer storage medium stores instructions which, when being run, implement the above-mentioned takeoff and landing control method of a flying automobile.

Compared with the prior art, the computer storage medium provided in the embodiment of the present invention has the same beneficial effects as the takeoff and landing control method of a flying automobile described in the above technical solution, which will not be repeated here.

In the description of the above implementations, specific features, structures, materials or characteristics may be combined in a suitable manner in any one or more embodiments or examples.

Described above are only specific implementations of the present invention, but the protection scope of the present invention is not limited thereto, and all changes or substitutions that are readily conceivable to those skilled in the art within the technical scope disclosed by the present invention should be encompassed within the protection scope of the present invention. Thus, the protection scope of the present invention should be defined by the claims.

What is claimed is:

1. A takeoff and landing control method of a multimodal air-ground amphibious vehicle, wherein the multimodal air-ground amphibious vehicle comprises an aircraft and a vehicle that are rigidly connected, the takeoff and landing control method of the multimodal air-ground amphibious vehicle comprising:

receiving dynamic parameters of the multimodal air-ground amphibious vehicle;

processing the dynamic parameters by a coupling dynamic model of the multimodal air-ground amphibious vehicle to obtain dynamic control parameters of the multimodal air-ground amphibious vehicle; wherein the coupling dynamic model of the multimodal air-ground amphibious vehicle comprises a motion equation of the multimodal air-ground amphibious vehicle in a touchdown state; and the motion equation of the multimodal air-ground amphibious vehicle in the touchdown state is determined by a two-degree-of-freedom suspension dynamic equation of the multimodal air-ground amphibious vehicle in the touchdown state and a six-degree-of-freedom motion equation of the multimodal air-ground amphibious vehicle in the touchdown state; and controlling takeoff and landing of the multimodal air-ground amphibious vehicle according to the dynamic control parameters of the multimodal air-ground amphibious vehicle;

wherein the motion equation of the multimodal air-ground amphibious vehicle in the touchdown state satisfies:

$$M\dot{V}_X = \sum_{i=1}^{4}(F_{di}\cos(\delta_i+\psi)-F_{Li}\sin(\delta_i+\psi))-F_a\cos(\psi)$$

$$M\dot{V}_Y = \sum_{i=1}^{4}(F_{di}\sin(\delta_i+\psi)+F_{Li}\cos(\delta_i+\psi))-F_a\sin(\psi)$$

$$I_x\ddot{\varphi} = M_s g h_s \sin\varphi - \sum_{i=1}^{4}(F_{di}\sin\delta_i+F_{Li}\cos\delta_i)h_s\cos\varphi +$$
$$\sum_{i=1}^{4}L_x\left[c(\dot{Z}_{i1}-\dot{Z}_{i2})+k_{z2}(Z_{i1}-Z_{i2})\right]$$

$$I_y\ddot{\theta} = M_s g h_s \sin\theta - \sum_{i=1}^{4}(F_{di}\cos\delta_i-F_{Li}\sin\delta_i)h_s\cos\theta +$$
$$\sum_{i=1}^{4}L_y\left[c(\dot{Z}_{i1}-\dot{Z}_{i2})+k_{z2}(Z_{i1}-Z_{i2})\right]$$

$$I_z\ddot{\psi} = \sum_{i=1}^{4}(L_y(-F_{di}\cos\delta_i+F_{Li}\sin\delta_i)+L_x(F_{di}\sin\delta_i+F_{Li}\cos\delta_i))-M_a$$

$$M_w\ddot{z}_{i1} = -c_z(\dot{z}_{i1}-\dot{z}_{i2})-k_{z2}(z_{i1}-z_{i2})-k_{z1}z_{i1}+q$$
$$M_s\ddot{z}_{i2} = -c_z(\dot{z}_{i2}-\dot{z}_{i1})-k_{z2}(z_{i2}-z_{i1})-F_{Ni}$$

wherein M is a mass of the multimodal air-ground amphibious vehicle, $M_S$ is a sprung mass, $M_W$ is a tire mass, $I_X$ is a rotational inertia around an x-axis of the multimodal air-ground amphibious vehicle relative to a center of mass, $I_Y$ is a rotational inertia around a y-axis of the multimodal air-ground amphibious vehicle relative to the center of mass, $I_Z$ is a rotational inertia around a z-axis of the multimodal air-ground amphibious vehicle relative to the center of mass, φ is a roll angle of the multimodal air-ground amphibious vehicle around the x-axis, θ is a pitch angle of the multimodal air-ground amphibious vehicle around the y-axis, ψ is a yaw angle of the multimodal air-ground amphibious vehicle around the z-axis, $V_X$ is a velocity of the multimodal air-ground amphibious vehicle in the x-axis direction, $V_Y$ is a velocity of the multimodal air-ground amphibious vehicle in the y-axis direction, $V_z$ is a velocity of the multimodal air-ground amphibious vehicle in the z-axis direction, $F_{di}$ is a tire longitudinal force of the multimodal air-ground amphibious vehicle, $F_{Li}$ is a tire lateral force of the multimodal air-ground amphibious vehicle, $\delta_i$ tire steering angle, $F_a$ is an air resistance of the multimodal air-ground amphibious vehicle traveling in the touchdown state, g is a gravitational acceleration, $h_s$ is a height from a center of gravity of the sprung mass to a center of gravity of the vehicle, $L_x$ is a distance of a tire from the center of the multimodal air-ground amphibious vehicle in the x-axis direction, $L_y$ is a distance of the tire from the center of the multimodal air-ground amphibious vehicle in the y-axis direction distance, $M_a$ is an air resistance moment of the multimodal air-ground amphibious vehicle traveling in the touchdown state, $K_{z1}$ is a tire stiffness, $K_{z2}$ is a suspension shock absorber stiffness, $c_z$ is a suspension shock absorber damping coefficient, q is an external excitation to the vehicle, $Z_{i2}$ is a vertical displacement of a vehicle body corresponding to each tire, $Z_{i1}$ is a vertical displacement of each tire, $F_{Ni}$ is a vertical load pressure of the tire, and i is a tire number.

2. The takeoff and landing control method of the multimodal air-ground amphibious vehicle according to claim 1, wherein the two-degree-of-freedom suspension dynamic equation satisfies:

$$M_w\ddot{z}_{i1}=-c_z(\dot{z}_{i1}-\dot{z}_{i2})-k_{z2}(Z_{i1}-Z_{i2})-k_{z1}Z_{i1}+q$$

$$M_s\ddot{z}_{i2}=-c_z(\dot{z}_{i2}-\dot{z}_{i1})-k_{z2}(Z_{i2}-Z_{i1})-F_{Ni}$$

wherein $F_{Ni}$ is a vertical load of each tire, $M_W$ is the tire mass, $M_S$ is the sprung mass, $K_{z1}$ is the tire stiffness, $K_{z2}$ is the suspension shock absorber stiffness, $c_z$ is the suspension shock absorber damping coefficient, $Z_{i2}$ is the vertical displacement of the vehicle body corresponding to each tire, $z_{i1}$ is the vertical displacement of each tire, q is the external excitation to the vehicle, and i is the tire number.

3. The takeoff and landing control method of the multimodal air-ground amphibious vehicle according to claim 1, wherein the six-degree-of-freedom motion equation of the multimodal air-ground amphibious vehicle in the touchdown state satisfies:

$$M\dot{V}_X = \sum_{i=1}^{4}(F_{di}\cos(\delta_i+\psi)-F_{Li}\sin(\delta_i+\psi))-F_a\cos(\psi)$$

$$M\dot{V}_Y = \sum_{i=1}^{4}(F_{di}\sin(\delta_i+\psi)+F_{Li}\cos(\delta_i+\psi))-F_a\sin(\psi)$$

$$I_x\ddot{\varphi} = M_s g h_s \sin\varphi - \sum_{i=1}^{4}(F_{di}\sin\delta_i+F_{Li}\cos\delta_i)h_s\cos\varphi +$$
$$\sum_{i=1}^{4}L_x\left[c(\dot{Z}_{i1}-\dot{Z}_{i2})+k_{z2}(Z_{i1}-Z_{i2})\right]$$

$$I_y\ddot{\theta} = M_s g h_s \sin\theta - \sum_{i=1}^{4}(F_{di}\cos\delta_i-F_{Li}\sin\delta_i)h_s\cos\theta +$$
$$\sum_{i=1}^{4}L_y\left[c(\dot{Z}_{i1}-\dot{Z}_{i2})+k_{z2}(Z_{i1}-Z_{i2})\right]$$

$$I_z\ddot{\psi} = \sum_{i=1}^{4}(L_y(-F_{di}\cos\delta_i+F_{Li}\sin\delta_i)+L_x(F_{di}\sin\delta_i+F_{Li}\cos\delta_i))-M_a$$

wherein M is the mass of the multimodal air-ground amphibious vehicle, $M_s$ is the sprung mass, $I_x$ is the rotational inertia around the x-axis of the multimodal air-ground amphibious vehicle relative to the center of mass, $I_y$ is the rotational inertia around the y-axis of the multimodal air-ground amphibious vehicle relative to the center of mass, $I_z$ is the rotational inertia around the z-axis of the multimodal air-ground amphibious vehicle relative to the center of mass, $\phi$ is the roll angle of the multimodal air-ground amphibious vehicle around the x-axis, $\iota$ is the pitch angle of the multimodal air-ground amphibious vehicle around the y-axis, $\psi$ is the yaw angle of the multimodal air-ground amphibious vehicle around the z-axis, $V_X$ is the velocity of the multimodal air-ground amphibious vehicle in the x-axis direction, $V_Y$ is the velocity of the multimodal air-ground amphibious vehicle in the y-axis direction, $V_Z$ is the velocity of the multimodal air-ground amphibious vehicle in the z-axis direction, $F_{di}$ is the tire longitudinal force of the multimodal air-ground amphibious vehicle, $F_{Li}$ is the tire lateral force of the multimodal air-ground amphibious vehicle, $\delta_i$ is the tire steering angle, $F_a$ is the air resistance of the multimodal air-ground amphibious vehicle traveling in the touchdown state, g is the gravitational acceleration, $h_s$ is the height from the center of gravity of the sprung mass to the center of gravity of the vehicle, $L_x$ is the distance of the tire from the center of the multimodal air-ground amphibious vehicle in the x-axis direction, $L_y$ is the distance of the tire from the center of the multimodal air-ground amphibious vehicle in the y-axis direction distance, $z_{i2}$ is the vertical displacement of the vehicle body corresponding to each tire, $z_{i1}$ is the vertical displacement of each tire, $M_a$ is the air resistance moment of the multimodal air-ground amphibious vehicle traveling in the touchdown state, and i is the tire number.

4. The takeoff and landing control method of the multimodal air-ground amphibious vehicle according to claim 1, wherein the tire longitudinal force $F_{di}$, satisfies:

$$F_{di} = \begin{cases} 10 k_{di} F_{Ni} \alpha_i, & |\zeta_i| \leq 0.1 \\ k_{di} F_{Ni}, & \zeta_i > 0.1 \\ k_{di} F_{Ni}, & \zeta_i < 0.1 \end{cases}$$

wherein $\alpha_i$ is a tire sideslip angle, $k_{di}$ is a tire longitudinal slip stiffness coefficient, $F_{Ni}$ is a vertical load pressure of each tire, and $\zeta_i$ is a tire longitudinal slip rate; and the tire lateral force $F_{Li}$ satisfies:

$$F_{Li} = \begin{cases} k_{Li} F_{Ni} \alpha_i, & |\alpha_i| \leq 5 \\ 5 F_{Ni} \alpha_i, & \alpha_i > 5 \\ -5 F_{Ni} \alpha_i, & \alpha_i < -5 \end{cases}$$

wherein $k_{li}$ is a tire lateral slip stiffness coefficient, $\alpha_i$ is the tire sideslip angle, and $F_{Ni}$ is the tire vertical load.

5. The takeoff and landing control method of the multimodal air-ground amphibious vehicle according to claim 1, wherein the coupling dynamic model of the multimodal air-ground amphibious vehicle further comprises a motion equation of the multimodal air-ground amphibious vehicle in a flying state, and the motion equation of the multimodal air-ground amphibious vehicle in the flying state satisfies:

$$m\dot{V}_X = -K_1 V_X - (\cos\psi \sin\theta \cos\phi + \sin\psi \sin\phi) \cdot u_1$$

$$m\dot{V}_Y = -K_2 V_Y - (\sin\psi \sin\theta \cos\phi - \cos\psi \sin\phi) \cdot u_1$$

$$m\dot{V}_Z = -K_3 V_Z - mg + \cos\phi \cos\theta \cdot u_1$$

$$I_x \ddot{\phi} = -K_4 l \dot{\phi} + l \cdot u_2$$

$$I_y \ddot{\theta} = -K_5 l \dot{\theta} + l \cdot u_3$$

$$I_z \ddot{\psi} = -K_6 \dot{\psi} + c \cdot u_4$$

wherein m is a mass of the aircraft, g is the gravitational acceleration, $V_X$ is the velocity of the multimodal air-ground amphibious vehicle in the x-axis direction, $V_Y$ is the velocity of the multimodal air-ground amphibious vehicle in the y-axis direction, $V_Z$ is the velocity of the multimodal air-ground amphibious vehicle in the z-axis direction, $I_x$ is the rotational inertia around the x-axis of the multimodal air-ground amphibious vehicle relative to the center of mass, $I_y$ is the rotational inertia around the y-axis of the multimodal air-ground amphibious vehicle relative to the center of mass, $I_z$ is the rotational inertia around the z-axis of the multimodal air-ground amphibious vehicle relative to the center of mass, $\phi$ is the roll angle of the multimodal air-ground amphibious vehicle around the x-axis, $\theta$ is the pitch angle of the multimodal air-ground amphibious vehicle around the y-axis, $\psi$ is the yaw angle of the multimodal air-ground amphibious vehicle around the z-axis, $K_i$(i=1 . . . 6) is an aerodynamic damping parameter, l is a distance from the center of the aircraft to a propeller axis, C is a conversion constant between a force and a moment, $u_1$ is a dynamic input of vertical motion of the multimodal air-ground amphibious vehicle in the flying state, $u_2$ is a dynamic input of roll motion of the multimodal air-ground amphibious vehicle in the flying state, $u_3$ is a dynamic input of pitch motion of the multimodal air-ground amphibious vehicle in the flying state, $u_4$ is a dynamic input of yaw motion of the multimodal air-ground amphibious vehicle in the flying state, and i is the tire number.

6. The takeoff and landing control method of the multimodal air-ground amphibious vehicle according to claim 1, wherein the dynamic parameters comprise attitude parameters of tires of the multimodal air-ground amphibious vehicle and flight dynamic parameters; and the attitude parameters of each tire comprise an angular velocity and a steering angle.

7. The takeoff and landing control method of the multimodal air-ground amphibious vehicle according to claim 1, wherein the dynamic control parameters comprise motion parameters of six degrees of freedom of the multimodal air-ground amphibious vehicle, a vertical displacement of each tire of the multimodal air-ground amphibious vehicle, and a vertical displacement of a vehicle body corresponding to each tire of the multimodal air-ground amphibious vehicle.

* * * * *